(12) United States Patent
Miyamoto et al.

(10) Patent No.: US 9,719,449 B2
(45) Date of Patent: Aug. 1, 2017

(54) DIAGNOSIS SYSTEM OF INTERNAL COMBUSTION ENGINE

(71) Applicants: Hiroshi Miyamoto, Shizuoka (JP); Keiichiro Aoki, Shizuoka (JP); Yasushi Iwazaki, Ebina (JP)

(72) Inventors: Hiroshi Miyamoto, Shizuoka (JP); Keiichiro Aoki, Shizuoka (JP); Yasushi Iwazaki, Ebina (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/900,645

(22) PCT Filed: Jun. 26, 2013

(86) PCT No.: PCT/JP2013/067546
§ 371 (c)(1),
(2) Date: Dec. 22, 2015

(87) PCT Pub. No.: WO2014/207843
PCT Pub. Date: Dec. 31, 2014

(65) Prior Publication Data
US 2016/0138506 A1    May 19, 2016

(51) Int. Cl.
*F01N 3/00*    (2006.01)
*F02D 41/14*   (2006.01)
(Continued)

(52) U.S. Cl.
CPC ........... *F02D 41/1495* (2013.01); *F01N 3/10* (2013.01); *F01N 11/007* (2013.01);
(Continued)

(58) Field of Classification Search
USPC ..... 60/274, 276, 277, 285, 286; 123/406.13, 123/406.14, 406.27, 690
See application file for complete search history.

(56) References Cited

U.S. PATENT DOCUMENTS 5,672,817 A   9/1997  Sagisaka et al.
5,795,992 A * 8/1998  Tanahashi ............. F01N 11/002
                                                        60/276
(Continued)

FOREIGN PATENT DOCUMENTS

JP    H08-177575 A    7/1996
JP    2001-242126 A   9/2001
(Continued)

*Primary Examiner* — Binh Q Tran
(74) *Attorney, Agent, or Firm* — Andrews Kurth Kenyon LLP

(57) ABSTRACT

An internal combustion engine comprises an exhaust purification catalyst arranged in an exhaust passage of the internal combustion engine and being able to store oxygen in inflowing exhaust gas and an air-fuel ratio sensor arranged at a downstream side of the exhaust purification catalyst in a direction of exhaust flow and detecting an air-fuel ratio of exhaust gas flowing out from the exhaust purification catalyst and stops or decreases a feed of fuel to a combustion chamber as fuel cut control. The abnormality diagnosis system calculates a characteristic of change of an air-fuel ratio based on an output air-fuel ratio output from the air-fuel ratio sensor at the time when the output air-fuel ratio first passes a part of an air-fuel ratio region of a stoichiometric air-fuel ratio or more after an end of the fuel cut control, and diagnoses abnormality of the air-fuel ratio sensor based on the characteristic of change of the air-fuel ratio. As a result, the diagnosis system can diagnose the abnormality of deterioration of response of the downstream side air-fuel ratio sensor when necessary without fail when performing fuel cut control.

11 Claims, 14 Drawing Sheets

(51) Int. Cl.

| | | |
|---|---|---|
| *F02D 41/12* | (2006.01) | |
| *F01N 11/00* | (2006.01) | |
| *F01N 3/10* | (2006.01) | |
| *F02D 41/02* | (2006.01) | |
| *F02D 41/22* | (2006.01) | |
| *F01N 13/00* | (2010.01) | |

(52) U.S. Cl.
CPC ....... *F02D 41/0295* (2013.01); *F02D 41/123* (2013.01); *F02D 41/1441* (2013.01); *F02D 41/1454* (2013.01); *F01N 13/009* (2014.06); *F01N 2550/02* (2013.01); *F01N 2900/0416* (2013.01); *F01N 2900/1624* (2013.01); *F02D 2041/228* (2013.01); *F02D 2200/0814* (2013.01); *F02D 2200/0816* (2013.01); *Y02T 10/47* (2013.01)

(56) References Cited

U.S. PATENT DOCUMENTS

| | | | | |
|---|---|---|---|---|
| 5,956,943 A | * | 9/1999 | Carnevale | F02D 41/1474 123/688 |
| 6,148,611 A | * | 11/2000 | Sato | F02D 31/008 123/680 |
| 7,055,312 B2 | * | 6/2006 | Osawa | B60W 10/06 180/65.235 |
| 7,779,619 B2 | * | 8/2010 | Takubo | F01N 11/007 60/277 |
| 8,443,781 B2 | * | 5/2013 | Demura | F02D 41/0042 123/325 |
| 2011/0225951 A1 | | 9/2011 | Sato | |

FOREIGN PATENT DOCUMENTS

| | | |
|---|---|---|
| JP | 2003-020989 A | 1/2003 |
| JP | 2004-225684 A | 8/2004 |
| JP | 2005-030358 A | 2/2005 |
| JP | 2010-007534 A | 1/2010 |
| JP | 2010-025090 A | 2/2010 |
| JP | 2010-163904 A | 7/2010 |
| JP | 2011-196230 A | 10/2011 |
| JP | 2011-208605 A | 10/2011 |
| JP | 2012-052462 A | 3/2012 |
| JP | 2012-127356 A | 7/2012 |

* cited by examiner

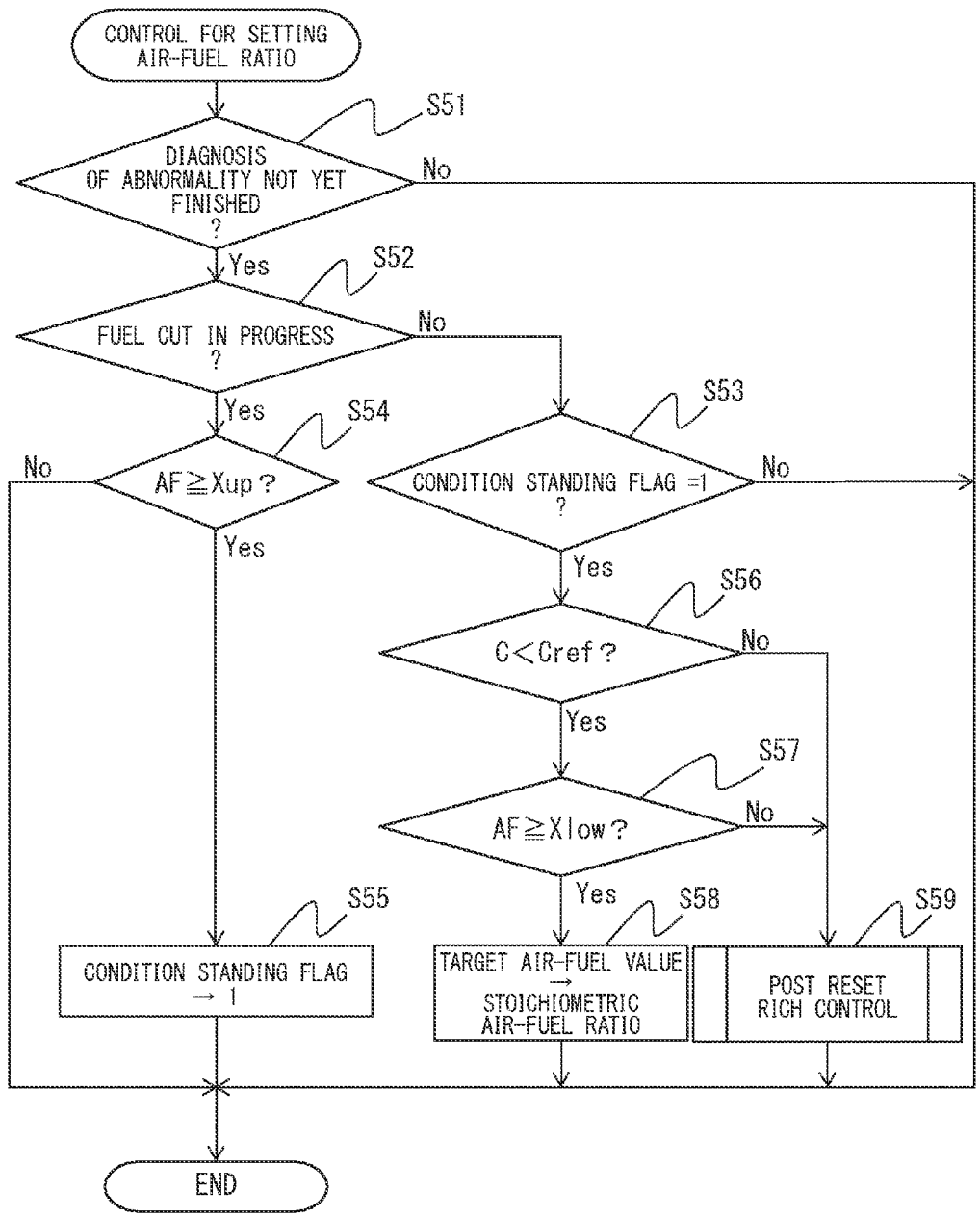

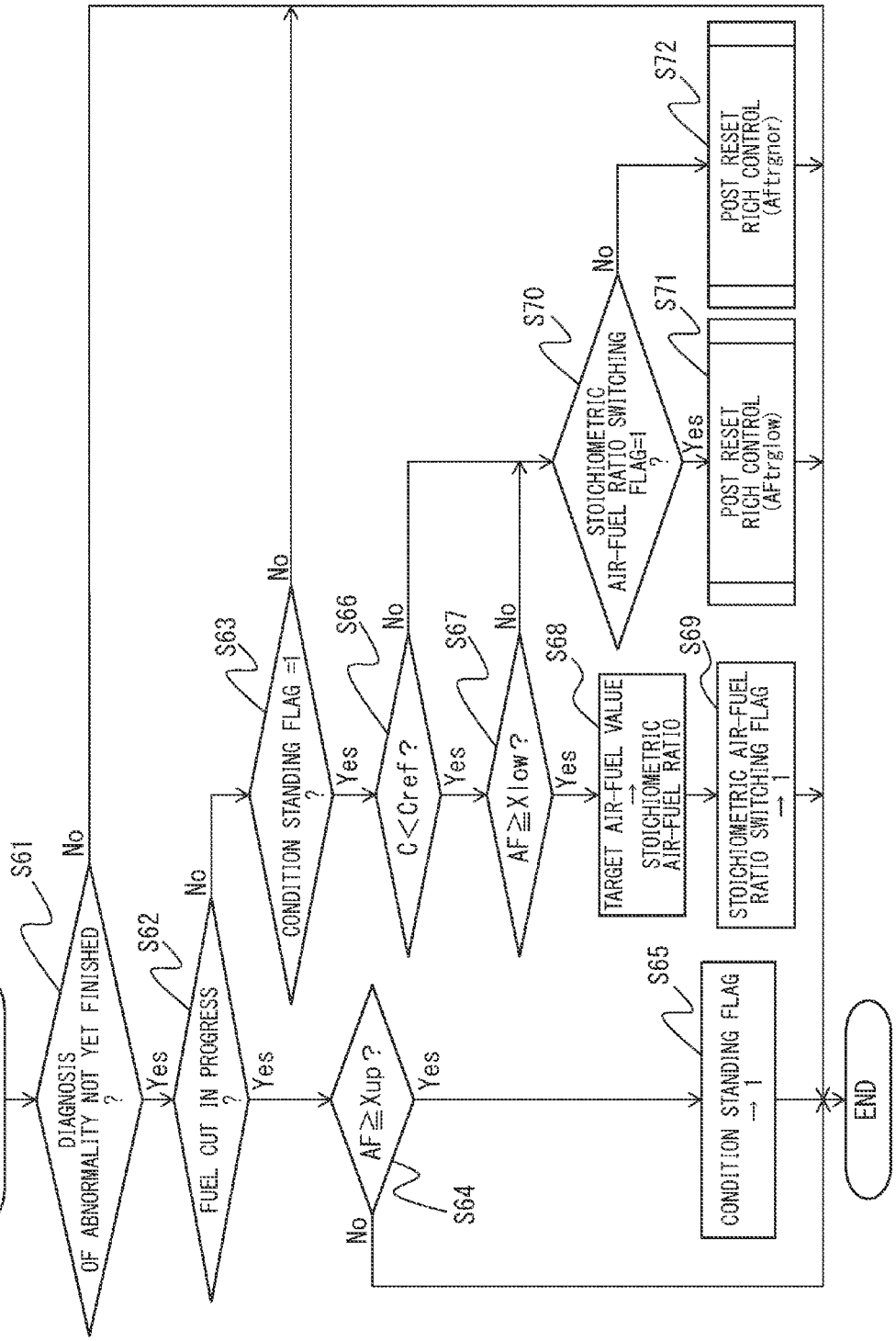

DIAGNOSIS SYSTEM OF INTERNAL COMBUSTION ENGINE

CROSS-REFERENCE TO RELATED APPLICATION

This is a national phase application based on the PCT International Patent Application No. PCT/JP2013/067546 filed Jun. 26, 2013, the entire contents of which are incorporated herein by reference.

TECHNICAL FIELD

The present invention relates to a diagnosis system of an internal combustion engine.

BACKGROUND ART

Known in the past has been an internal combustion engine providing an air-fuel ratio sensor in an exhaust passage of the internal combustion engine and controlling an amount of fuel which is fed to the internal combustion engine based on an output of the air-fuel ratio sensor.

The air-fuel ratio sensor used in such an internal combustion engine gradually deteriorates along with use. As such deterioration, for example, deterioration of response of the air-fuel ratio sensor may be mentioned. The deterioration of response of the air-fuel ratio sensor occurs due to air holes provided in a sensor cover for preventing a sensor element from being covered by water ending up being partially clogged by particulate matter (PM). If the air holes are partially clogged in this way, the exchange of gas between the inside and outside of the sensor cover becomes slower, and as a result the output of the air-fuel ratio sensor ends up becoming blunter. If such deterioration of the air-fuel ratio sensor occurs, the various control operations performed by the control system of an internal combustion engine end up being hindered.

Therefore, diagnosis systems diagnosing the abnormality of deterioration of response of an air-fuel ratio sensor have been proposed (for example, see PLTs 1 to 4). In such diagnosis systems, as a diagnosis system diagnosing abnormality of an air-fuel ratio sensor arranged at a downstream side from an exhaust purification catalyst (below, referred to as the "downstream side air-fuel ratio sensor"), for example, a system diagnosing abnormality of the downstream side air-fuel ratio sensor during fuel cut control stopping or greatly reducing the feed of fuel to a combustion chamber has been proposed (for example, PLT 1).

In particular, in the diagnosis system described in PLT 1, during fuel cut control, the time period of passage when an air-fuel ratio corresponding to the output of the downstream side air-fuel ratio sensor (below, referred to as the "output air-fuel ratio") passes through a predetermined air-fuel ratio region is used as the basis for diagnosis of abnormality. Specifically, when the time period of passage is larger than a predetermined abnormality judgment value, the downstream side air-fuel ratio sensor is diagnosed as suffering from the abnormality of deterioration of response. In addition, in the diagnosis system described in PLT 1, considering the trends in the exhaust air-fuel ratio right before start of fuel cut control and the changes in the time period of passage depending on the oxygen storage amount of the exhaust purification catalyst, if the integrated value of the intake air in the period from the start of fuel cut control to when the output air-fuel ratio reaches a predetermined air-fuel ratio richer than the predetermined air-fuel ratio region is less than a predetermined threshold value, the downstream side air-fuel ratio sensor is not diagnosed for abnormality.

CITATIONS LIST

Patent Literature

PLT 1. Japanese Patent Publication No. 2012-052462A
PLT 2. Japanese Patent Publication No. 2004-225684A
PLT 3. Japanese Patent Publication No. 2001-242126A
PLT 4. Japanese Patent Publication No. 2010-007534A

SUMMARY OF INVENTION

Technical Problem

As explained above, in the diagnosis system described in PLT 1, if the integrated value of the amount of intake air in the period from the start of fuel cut control to when the output air-fuel ratio reaches a predetermined air-fuel ratio is less than a predetermined threshold value, diagnosis of abnormality of the air-fuel ratio sensor is prohibited. For this reason, at the time of fuel cut control, if the state where this integrated value of the amount of intake air is less than a predetermined threshold value is repeated, the air-fuel ratio sensor will not be diagnosed for abnormality for a long time period.

Therefore, in consideration of the above problem, an object of the present invention is to provide a diagnosis system of an internal combustion engine which can diagnose the abnormality of deterioration of response of a downstream side air-fuel ratio sensor when necessary without fail when performing fuel cut control.

Solution to Problem

In order to solve the above problem, in a first invention, there is provided a diagnosis system of an internal combustion engine comprising an exhaust purification catalyst arranged in an exhaust passage of the internal combustion engine and able to store oxygen in inflowing exhaust gas and an air-fuel ratio sensor arranged at a downstream side of the exhaust purification catalyst in a direction of exhaust flow and detecting an air-fuel ratio of exhaust gas flowing out from the exhaust purification catalyst and stopping or decreasing a feed of fuel to a combustion chamber as fuel cut control, wherein the diagnosis system calculates a characteristic of change of an air-fuel ratio based on an output air-fuel ratio output from the air-fuel ratio sensor when the output air-fuel ratio first passes a part of an air-fuel ratio region of a stoichiometric air-fuel ratio or more after an end of the fuel cut control, and diagnoses abnormality of the air-fuel ratio sensor based on the characteristic of change of the air-fuel ratio.

In a second invention, the diagnosis system further comprises an air-fuel ratio control means for controlling an air-fuel ratio of the exhaust gas flowing into the exhaust purification catalyst to a target air-fuel ratio, the target air-fuel ratio is set to a first air-fuel ratio richer than the stoichiometric air-fuel ratio after the end of the fuel cut control, and, when diagnosing abnormality of the air-fuel ratio sensor, the target air-fuel ratio is set to a second air-fuel ratio leaner than the first air-fuel ratio before being set to the first air-fuel ratio after the end of the fuel cut control in the first invention.

In a third invention, when not diagnosing abnormality of the air-fuel ratio sensor, the target air-fuel ratio is set to the first air-fuel ratio immediately after the end of the fuel cut control in the second invention.

In a forth invention, when the air-fuel ratio sensor has already finished being diagnosed for abnormality after startup of the internal combustion engine, the air-fuel ratio sensor is not diagnosed for abnormality in the third invention.

In a fifth invention, the second air-fuel ratio is a stoichiometric air-fuel ratio in any one of the second to fourth inventions.

In a sixth invention, when setting the target air-fuel ratio to the second air-fuel ratio after the end of the fuel cut control, the target air-fuel ratio is made to change from the second air-fuel ratio to the first air-fuel ratio after the air-fuel ratio sensor has finished being diagnosed for abnormality in any one of the second to fifth inventions.

In a seventh invention, the diagnosis system further comprises a catalyst deterioration degree estimating means for estimating a degree of deterioration of the exhaust purification catalyst, and when the degree of deterioration of the catalyst detected by the catalyst deterioration degree estimating means is a predetermined reference degree of deterioration or less, even when diagnosing the air-fuel ratio sensor for abnormality, the target air-fuel ratio is immediately set to the first air-fuel ratio after the end of the fuel cut control in any one of the second to sixth inventions.

In an eighth invention, the first air-fuel ratio is made a richer air-fuel ratio when the target air-fuel ratio is set to the second air-fuel ratio before being set to the first air-fuel ratio compared with when the target air-fuel ratio is not set to a second air-fuel ratio before being set to the first air-fuel ratio in any one of the second to seventh inventions.

In a ninth invention, the air-fuel ratio sensor is a limit current type air-fuel ratio sensor outputting a limit current when an air-fuel ratio of exhaust gas passing through the air-fuel ratio sensor is within a predetermined air-fuel ratio region, and the air-fuel ratio region is within the air-fuel ratio region in which the air-fuel ratio sensor generates the limit current in any one of the first to eighth inventions.

In a tenth invention, the characteristic of change of the air-fuel ratio is a speed of change of the air-fuel ratio when the output air-fuel ratio of the air-fuel ratio sensor first passes the air-fuel ratio region, and, in diagnosing abnormality of the air-fuel ratio sensor, when the speed of change of the air-fuel ratio is slower than a speed of change of the abnormality criteria, it is judged that the air-fuel ratio sensor is abnormal, while when the speed of change of the air-fuel ratio is faster than the speed of change of the abnormality criteria, it is judged that the air-fuel ratio sensor is normal in any one of the first to ninth inventions.

In a eleventh invention, the characteristic of change of the air-fuel ratio is an integrated value of air-fuel ratio obtained by integrating an output air-fuel ratio of the air-fuel ratio sensor when the output air-fuel ratio is within the air-fuel ratio region, in diagnosing abnormality of the air-fuel ratio sensor, when the integrated value of air-fuel ratio is an integrated value used as reference for abnormality or more, it is judged that the air-fuel ratio sensor is abnormal, while when the integrated value of air-fuel ratio is smaller than the integrated value used as reference for abnormality, it is judged that the air-fuel ratio sensor is normal in any one of the first to ninth inventions.

In a twelfth invention, in diagnosing abnormality of the air-fuel ratio sensor, when it is judged that the air-fuel ratio sensor is abnormal, a warning light is lit in any one of the first to eleventh inventions.

According to the present invention, there is provided a diagnosis system of an internal combustion engine which can diagnose the abnormality of deterioration of response of a downstream side air-fuel ratio sensor when necessary without fail when performing fuel cut control.

BRIEF DESCRIPTION OF DRAWINGS

FIG. 14 is a flow chart showing a control routine for air-fuel ratio control which sets a target air-fuel ratio.

FIG. 15 is a flow chart showing a control routine for air-fuel ratio control which sets a target air-fuel ratio.

DESCRIPTION OF EMBODIMENTS

Figure 1:
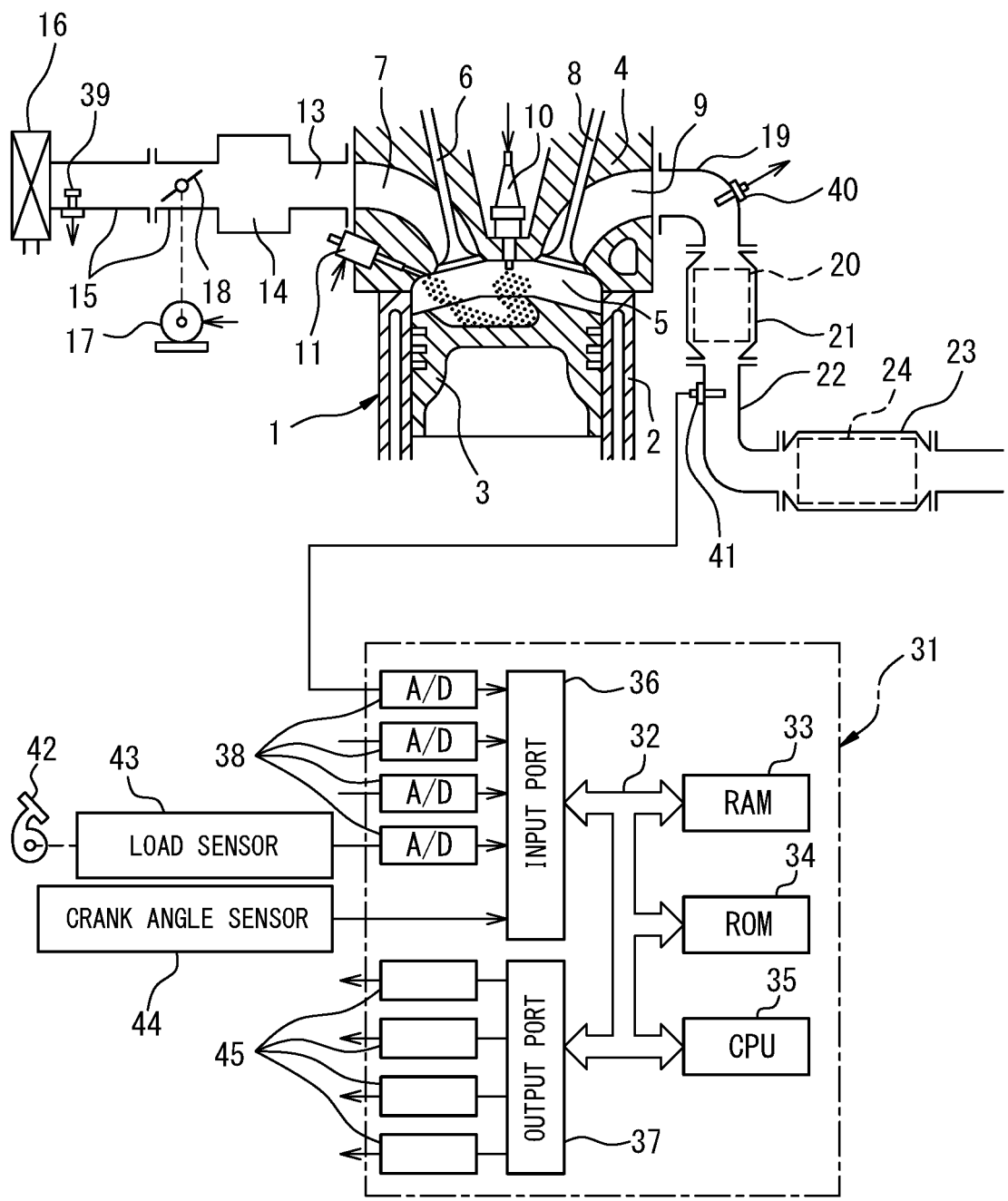
FIG. 1 is a view schematically showing an internal combustion engine in which the diagnosis system of the present invention is used.

Referring to the drawings, a diagnosis system of an internal combustion engine of the present invention will be explained in detail below. Note that, in the following explanation, similar component elements are assigned the same reference numerals. FIG. 1 is a view which schematically shows an internal combustion engine in which a control system according to a first embodiment of the present invention is used.

<Explanation of Internal Combustion Engine as a Whole>
Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, at the center part of the inside wall surface of the cylinder head 4, a spark plug 10 is arranged. A fuel injector 11 is arranged around the inside wall surface of the cylinder head 4. The spark plug 10 is configured to cause generation of a spark in accordance with an ignition signal. Further, the fuel injector 11 injects a predetermined amount of fuel into the combustion chamber 5 in accordance with an injection signal. Note that, the fuel injector 11 may be arranged so as to inject fuel inside the intake port 7. Further, in the present embodiment, as the fuel, gasoline with a stoichiometric air-fuel ratio of 14.6 is used. However, in the internal combustion engine in which the diagnosis system of the present invention is used, another fuel may also be used.

The intake port 7 in each cylinder is connected through a corresponding intake runner 13 to a surge tank 14. The surge tank 14 is connected through an intake pipe 15 to an air cleaner 16. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be turned by the throttle valve drive actuator 17 to thereby change the opening area of the intake passage.

On the other hand, the exhaust port 9 in each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which has an upstream side exhaust purification catalyst 20 built into it. The upstream side casing 21 is connected through an exhaust pipe 22 to a downstream side casing 23 which has a downstream side exhaust purification catalyst 24 built into it. The exhaust port 9, exhaust manifold 19, upstream side casing 21, exhaust pipe 22, and downstream side casing 23 form an exhaust passage.

The electronic control unit (ECU) 31 is comprised of a digital computer provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas flowing through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17.

<Explanation of Exhaust Purification Catalyst>

The upstream side exhaust purification catalyst 20 and downstream side exhaust purification catalyst 24 both have similar configurations. Below, only the upstream side exhaust purification catalyst 20 will be explained, but the downstream side exhaust purification catalyst 24 also has a similar configuration and actions.

The upstream side exhaust purification catalyst 20 is a three-way catalyst having an oxygen storage ability. Specifically, the upstream side exhaust purification catalyst 20 is comprised of a carrier made of ceramic on which a precious metal having a catalytic action (for example, platinum (Pt)) and a substance having an oxygen storage ability (for example, ceria ($CeO_2$)) are carried. The upstream side exhaust purification catalyst 20 has oxygen storage ability in addition to a catalytic action simultaneously removing the unburned gas (HC, CO, etc.) and nitrogen oxides ($NO_x$) if reaching a predetermined activation temperature.

According to the oxygen storage ability of the upstream side exhaust purification catalyst 20, the upstream side exhaust purification catalyst 20 stores the oxygen in the exhaust gas when the air-fuel ratio of the exhaust gas flowing into the upstream side exhaust purification catalyst 20 is leaner than the stoichiometric air-fuel ratio (below referred to as the "lean air-fuel ratio"). On the other hand, the upstream side exhaust purification catalyst 20 releases the oxygen stored in the upstream side exhaust purification catalyst 20 when the air-fuel ratio of the inflowing exhaust gas is richer than the stoichiometric air-fuel ratio (below, referred to as the "rich air-fuel ratio"). Note that, the "air-fuel ratio of the exhaust gas" means the ratio of the mass of the fuel to the mass of the air supplied until the exhaust gas is generated. Usually, it means the ratio of the mass of the fuel to the mass of the air fed into a combustion chamber 5. In this Description, sometimes the air-fuel ratio of the exhaust gas will be referred to as the "exhaust air-fuel ratio".

The upstream side exhaust purification catalyst 20 has a catalyzing action and an oxygen storage ability and therefore has an action of removing $NO_x$ and unburned gas in accordance with the oxygen storage amount. If the air-fuel ratio of the exhaust gas flowing into the upstream side exhaust purification catalyst 20 is a lean air-fuel ratio, when the oxygen storage amount is small, the upstream side exhaust purification catalyst 20 will store the oxygen in the exhaust gas and along with this the $NO_x$ will be reduced. However, there are limits to the oxygen storage ability. If the oxygen storage amount of the upstream side exhaust purification catalyst 20 exceeds the upper limit storage amount, the upstream side exhaust purification catalyst 20 will no longer store almost any further oxygen. In this case, if the air-fuel ratio of the exhaust gas flowing into the upstream side exhaust purification catalyst 20 is the lean air-fuel ratio, air-fuel ratio of the exhaust gas flowing out from the upstream side exhaust purification catalyst 20 will also become the lean air-fuel ratio.

On the other hand, if the air-fuel ratio of the exhaust gas flowing into the upstream side exhaust purification catalyst 20 is a rich air-fuel ratio, when the oxygen storage amount is large, the oxygen stored in the upstream side exhaust purification catalyst 20 will be released and the unburned gas in the exhaust gas will be removed by oxidation. However, if the oxygen storage amount of the upstream side exhaust purification catalyst 20 becomes smaller and falls below the lower limit storage amount, the upstream side exhaust purification catalyst 20 will no longer release almost any further oxygen. In this case, if the air-fuel ratio of the exhaust gas flowing into the upstream side exhaust purification catalyst 20 is the rich air-fuel ratio, the air-fuel ratio of the exhaust gas flowing out from the upstream side exhaust purification catalyst 20 will also become a rich air-fuel ratio.

As explained above, according to the exhaust purification catalysts 20, 24 used in the present embodiment, the property of removal of the $NO_x$ and unburned gas in the exhaust gas changes in accordance with the air-fuel ratio of the exhaust gas flowing into the exhaust purification catalyst and the oxygen storage amount. Note that, the exhaust purification catalysts 20, 24 may also be catalysts different from three-way catalysts, as long as they have a catalytic action and oxygen storage ability.

<Explanation of Air-Fuel Ratio Sensor>

Figure 2:
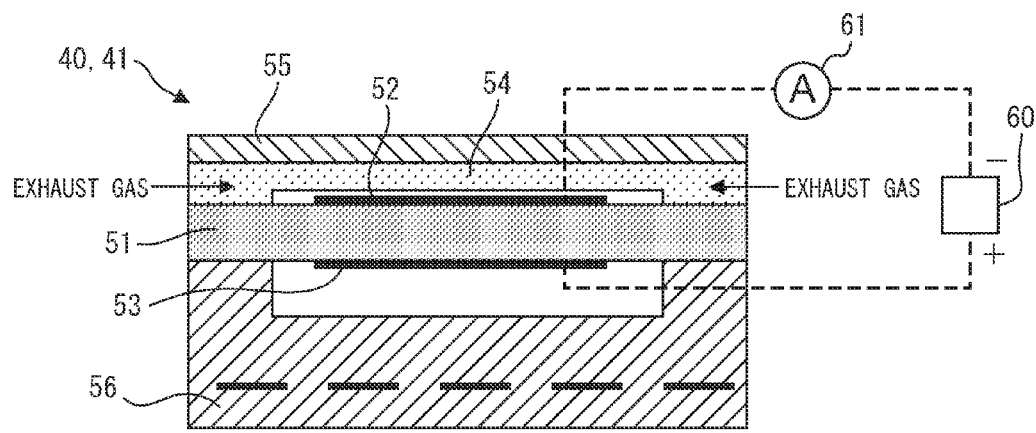
FIG. 2 is a schematic cross-sectional view of an air-fuel ratio sensor.

In the present embodiment, as the air-fuel ratio sensors 40, 41, limit current type air-fuel ratio sensors are used. FIG. 2 will be used to simply explain the structures of the air-fuel ratio sensors 40, 41. The air-fuel ratio sensors 40, 41 are provided with solid electrolyte layers 51, exhaust side electrodes 52 arranged on one side face of the same, atmosphere side electrodes 53 arranged on the other side face of the same, diffusion regulating layers 54 regulating diffusion of the passing exhaust gas, protective layers 55 protecting the diffusion regulating layers 54, and heater parts 56 heating the air-fuel ratio sensors 40, 41.

Each solid electrolyte layer 51 is formed from a sintered body of an oxygen ion conductive oxide such as $ZrO_2$ (zirconia), $HfO_2$, $ThO_2$, $Bi_2O_3$, etc. in which $CaO$, $MgO$, $Y_2O_3$, $Yb_2O_3$, etc. is added as a stabilizer. Further, the diffusion regulating layer 54 is formed from a porous sintered body of alumina, magnesia, silica, spinel, mullite, or other heat resistant inorganic substance.

Further, the exhaust side electrode 52 and the atmosphere side electrode 53 are formed by platinum or another precious metal with a high catalytic activity.

Further, between the exhaust side electrode and the atmosphere side electrode, a voltage applying device 60 mounted in the ECU 31 is used to apply the sensor applied voltage V. In addition, the ECU 31 is provided with a current detection device 61 detecting the current I flowing between these electrodes 52, 53 through the solid electrolyte layer when applying the sensor applied voltage. The current detected by this current detection device 61 is the output current of the air-fuel ratio sensors 40, 41.

Figure 3:
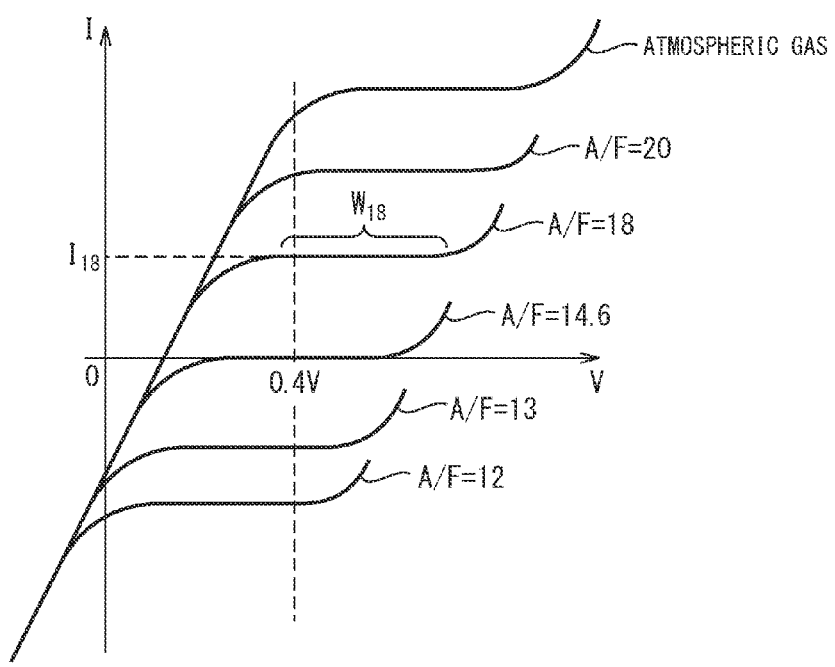
FIG. 3 is a view showing a relationship between a sensor applied voltage and output current at different exhaust air-fuel ratios.

The thus configured air-fuel ratio sensors 40, 41 have voltage-current (V-I) characteristics such as shown in FIG. 3. As will be understood from FIG. 3, the output current (I) becomes larger the larger (the leaner) the exhaust air-fuel ratio. Further, the line V-I at each exhaust air-fuel ratio has a region parallel to the V axis, that is, a region where even if the sensor applied voltage changes, the output current will not change much at all. This voltage region is called the "limit current region". The current at this time is called the "limit current". In FIG. 3, the limit current region and the limit current when the exhaust air-fuel ratio is 18 are respectively shown by $W_{18}$ and $I_{18}$.

On the other hand, in the region where the sensor applied voltage is lower than the limit current region, the output current changes substantially proportionally to the sensor applied voltage. Such a region is called a "proportional region". The slope at this time is determined by the DC element resistance of the solid electrolyte layer 51. Further, in the region where the sensor applied voltage is higher than the limit current region, the output current also increases along with an increase in the sensor applied voltage. In this region, on the exhaust side electrode 52, the moisture included in the exhaust gas breaks down etc. whereby the output voltage changes according to the change in the sensor applied voltage.

Figure 4:
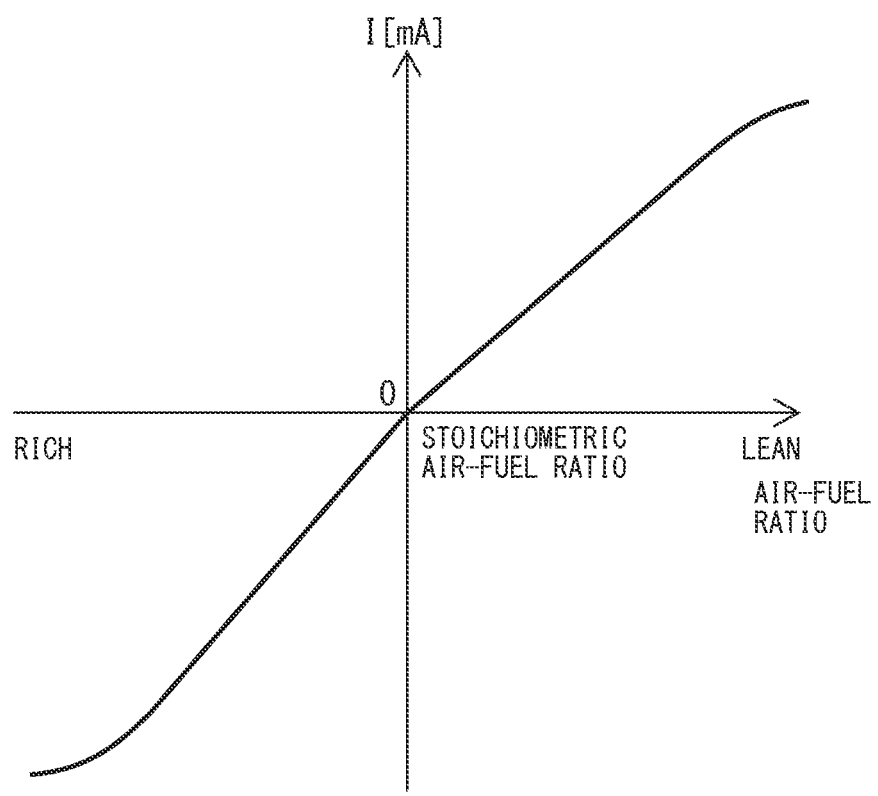
FIG. 4 is a view showing a relationship between an exhaust air-fuel ratio and output current I when making the sensor applied voltage constant.

FIG. 4 is a view showing a relationship between an exhaust air-fuel ratio and output current I when making the applied voltage a constant 0.4V or so. As will be understood from FIG. 4, at the air-fuel ratio sensors 40, 41, the larger the exhaust air-fuel ratio becomes (that is, the leaner), the larger the output current I from the air-fuel ratio sensors 40, 41. In addition, the air-fuel ratio sensors 40, 41 are configured so that when the exhaust air-fuel ratio is the stoichiometric air-fuel ratio, the output current I is zero. Further, when the exhaust air-fuel ratio becomes larger than a certain amount or more (in the present embodiment, 18 or more) or when it becomes smaller than a certain amount or less, the ratio of change of the output current to the change of the exhaust air-fuel ratio becomes smaller.

Note that, in the above example, limit current type air-fuel ratio sensors of the structure shown in FIG. 2 are used as the air-fuel ratio sensors 40, 41. However, so long as the output value changes smoothly with respect to a change in the exhaust air-fuel ratio at least near the stoichiometric air-fuel ratio, another structure of a limit current type air-fuel ratio sensor or an air-fuel ratio sensor not of the limit current type or any other air-fuel ratio sensor may be used.

<Basic Control>

In the thus configured internal combustion engine, based on the outputs of the upstream side air-fuel ratio sensor 40 and the downstream side air-fuel ratio sensor 41, the fuel injection amount from a fuel injector 11 etc. is controlled so that the air-fuel ratio of the exhaust gas flowing into the upstream side exhaust purification catalyst 20 becomes the optimum target air-fuel ratio based on the engine operating condition. In particular, in the present embodiment, the fuel injection amount from a fuel injector 11 is controlled so that the air-fuel ratio of the exhaust gas flowing out from the engine body 1 becomes the target air-fuel ratio.

As such a method of setting the fuel injection amount, the method of using the output of the upstream side air-fuel ratio sensor 40 as the basis for controlling the air-fuel ratio of the exhaust gas flowing into the upstream side exhaust purification catalyst 20 so as to become the target air-fuel ratio and using the output of the downstream side air-fuel ratio sensor 41 as the basis for correcting the output of the upstream side air-fuel ratio sensor 40 or changing the target air-fuel ratio may be mentioned. Note that, the control for making the air-fuel ratio of the exhaust gas the target air-fuel ratio is performed by the ECU 31. The ECU 31 functions as an air-fuel ratio control means.

Further, in the internal combustion engine according to an embodiment of the present invention, at the time of deceleration of the vehicle mounting the internal combustion engine etc. the fuel injection from a fuel injector 11 is stopped or greatly decreased to stop or greatly decrease the supply of fuel to the inside of a combustion chamber 5 as "fuel cut control". This fuel cut control is, for example, performed when the amount of depression of the accelerator pedal 42 is zero or substantially zero (that is, the engine load is zero or substantially zero) and the engine speed is a predetermined speed higher than the speed at the time of idling or is higher than the predetermined speed.

When fuel cut control is performed, air or exhaust gas like air is exhausted from the internal combustion engine, and therefore gas with an extremely high air-fuel ratio (that is, extremely high lean degree) flows into the upstream side exhaust purification catalyst 20. As a result, during fuel cut control, a large amount of oxygen flows into the upstream side exhaust purification catalyst 20, and the oxygen storage amount of the upstream side exhaust purification catalyst 20 reaches the upper limit storage amount.

Further, in the internal combustion engine of the present embodiment, during fuel cut control, oxygen stored in the upstream side exhaust purification catalyst 20 is made to be released by making the target air-fuel ratio of the exhaust gas flowing into the upstream side exhaust purification catalyst 20 the rich air-fuel ratio right after the end of the fuel cut control as "post reset rich control". This state is shown in FIG. 5.

Figure 5:
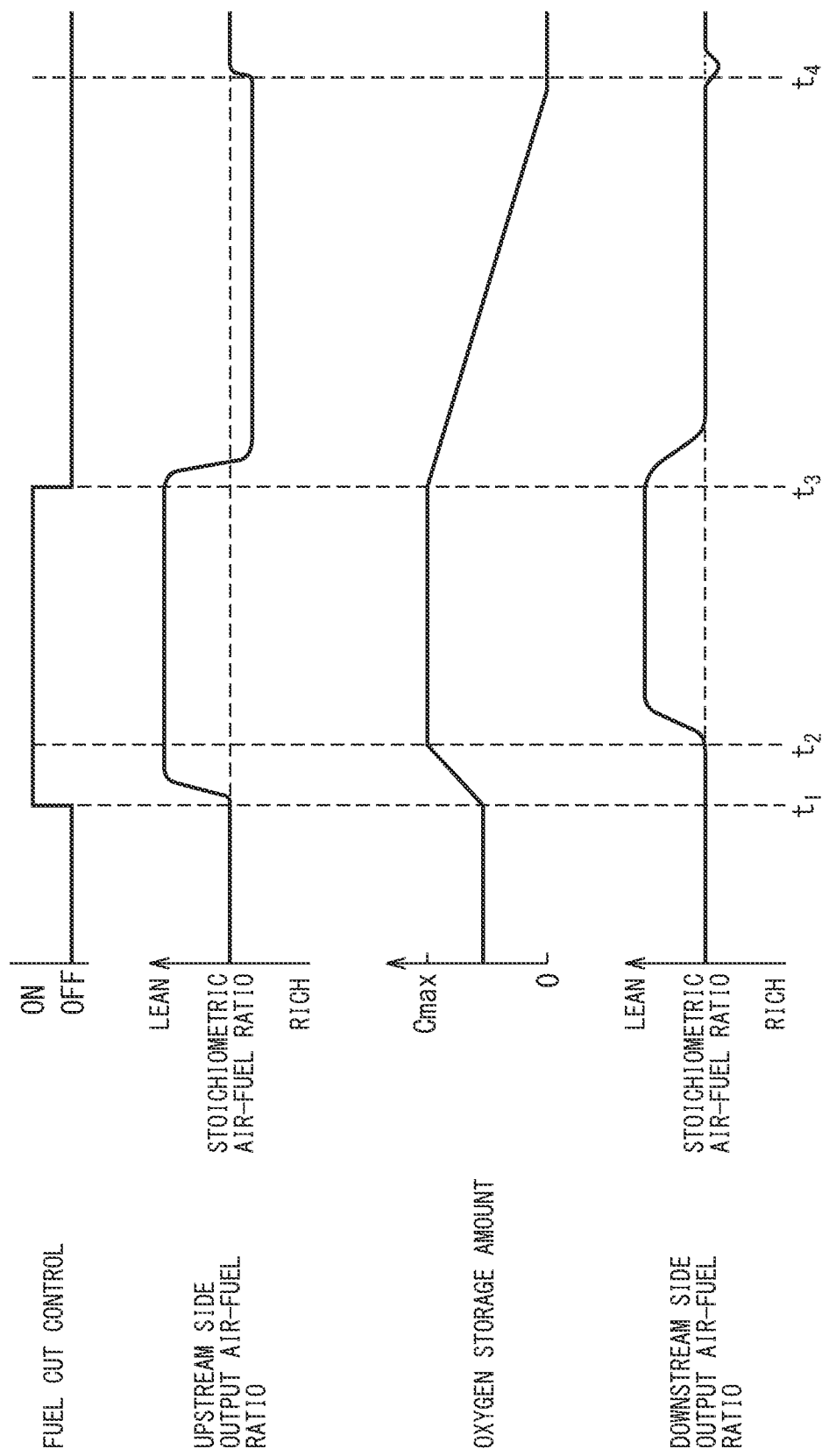
FIG. 5 is a time chart of an upstream side output air-fuel ratio, downstream side output air-fuel ratio, etc. before and after fuel cut control.

FIG. 5 is a time chart of the air-fuel ratio corresponding to the output value of the upstream side air-fuel ratio sensor 40 (below, referred to as the "upstream side output air-fuel ratio"), the oxygen storage amount of the upstream side exhaust purification catalyst 20, and the air-fuel ratio corresponding to the output value of the downstream side air-fuel ratio sensor 41 (below, referred to as the "downstream side output air-fuel ratio") when performing fuel cut control. In the illustrated example, the fuel cut control is started at the time $t_1$ and the fuel cut control is ended at the time $t_3$.

In the illustrated example, if fuel cut control is made to start at the time $t_1$, lean air-fuel ratio exhaust gas is discharged from the engine body 1. Along with this, the output air-fuel ratio of the upstream side air-fuel ratio sensor 40 increases. At this time, the oxygen in the exhaust gas flowing into the upstream side exhaust purification catalyst 20 is stored in the upstream side exhaust purification catalyst 20, and therefore the oxygen storage amount of the upstream side exhaust purification catalyst 20 increases, while the output air-fuel ratio of the downstream side air-fuel ratio sensor 41 remains as the stoichiometric air-fuel ratio.

After that, when, at the time $t_2$, the oxygen storage amount of the upstream side exhaust purification catalyst 20 reaches the upper limit storage amount (Cmax), the upstream side exhaust purification catalyst 20 can no longer store any more oxygen. For this reason, after the time $t_2$, the output air-fuel ratio of the downstream side air-fuel ratio sensor 41 becomes leaner than the stoichiometric air-fuel ratio.

If, at the time $t_3$, fuel cut control is made to end, to make the upstream side exhaust purification catalyst 20 release the oxygen stored during fuel cut control, post reset rich control is performed. In the post reset rich control, the target air-fuel ratio of the exhaust gas flowing into the upstream side exhaust purification catalyst 20 is set to a post reset rich air-fuel ratio slightly richer than the stoichiometric air-fuel ratio (for example, 14.5, first air-fuel ratio). Along with this, the output air-fuel ratio of the upstream side air-fuel ratio sensor 40 becomes the rich air-fuel ratio and the oxygen storage amount of the upstream side exhaust purification catalyst 20 gradually decreases. At this time, even if rich air-fuel ratio exhaust gas is made to flow into the upstream side exhaust purification catalyst 20, the oxygen stored in the upstream side exhaust purification catalyst 20 and the unburned gas in the exhaust gas react, and therefore the air-fuel ratio of the exhaust gas exhausted from the upstream side exhaust purification catalyst 20 becomes substantially the stoichiometric air-fuel ratio. For this reason, the output air-fuel ratio of the downstream side air-fuel ratio sensor 41 converges to substantially the stoichiometric air-fuel ratio.

If the oxygen storage amount of the upstream side exhaust purification catalyst 20 continues to decrease, finally the oxygen storage amount becomes substantially zero and unburned gas flows out from the upstream side exhaust purification catalyst 20. Due to this, at the time $t_4$, the exhaust air-fuel ratio detected by the downstream side air-fuel ratio sensor 41 becomes richer than the stoichiometric air-fuel ratio. If in this way the output air-fuel ratio of the downstream side air-fuel ratio sensor 41 reaches an end judgment air-fuel ratio slightly richer than the stoichiometric air-fuel ratio, the post reset rich control is made to end. After that, normal air-fuel ratio control is started. In the illustrated example, the target air-fuel ratio of the exhaust gas flowing into the upstream side exhaust purification catalyst 20 is made the stoichiometric air-fuel ratio.

Note that, the condition for ending post reset rich control need not necessarily be the time when the downstream side air-fuel ratio sensor 41 detects the rich air-fuel ratio. For example, the control may also be ended when a certain time period elapses after the end of fuel cut control or under other conditions.

<Basic Diagnosis of Deterioration of Response>

As explained above, when setting the fuel injection amount based on the air-fuel ratio sensors 40, 41, if the air-fuel ratio sensors 40, 41 become abnormal and the precision of output of the air-fuel ratio sensors 40, 41 ends up deteriorating, it no longer becomes possible to optimally set the fuel injection amount. As a result, the exhaust emissions and the fuel economy deteriorate. For this reason, in many internal combustion engines, a diagnosis system is provided for self-diagnosing abnormality of the air-fuel ratio sensors 40, 41.

In this regard, as such an abnormality of output of the air-fuel ratio sensors 40, 41, deterioration of response may be mentioned. Deterioration of response of the air-fuel ratio sensor, for example, occurs due to air holes provided in a sensor cover (cover provided at outside from protective layer 55) for preventing a sensor element from being covered by water ending up being partially clogged by particulate matter (PM). The state of the trends in an air-fuel ratio sensor when such deterioration of response occurs is shown in FIG. 6.

Figure 6:
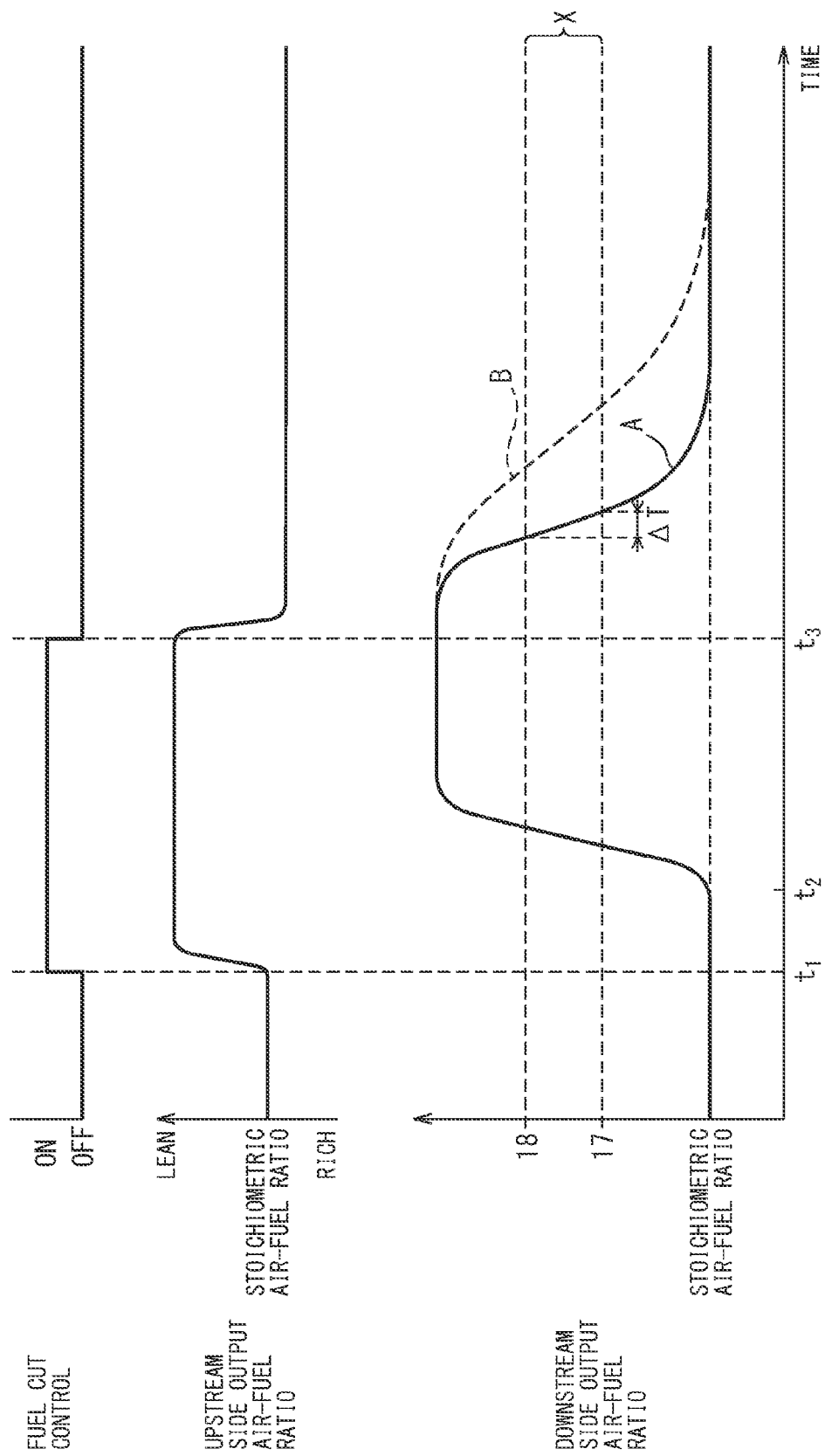
FIG. 6 is a time chart of an upstream side output air-fuel ratio, downstream side output air-fuel ratio, etc. before and after fuel cut control.

FIG. 6 is a time chart similar to FIG. 5 of the upstream side output air-fuel ratio and downstream side output air-fuel ratio before and after fuel cut control. In the illustrated example, fuel cut control is started at the time $t_1$ and fuel cut control is ended at the time $t_3$. If fuel cut control is ended, due to post reset rich control, rich air-fuel ratio exhaust gas is made to flow into the upstream side exhaust purification catalyst 20. However, the upstream side exhaust purification catalyst 20 stores a large amount of oxygen, and therefore the unburned gas in the exhaust gas flowing into the upstream side exhaust purification catalyst 20 is removed by reacting with the oxygen stored in the upstream side exhaust purification catalyst 20. As a result, the air-fuel ratio of the exhaust gas discharged from the upstream side exhaust purification catalyst 20 becomes the stoichiometric air-fuel ratio.

If the downstream side air-fuel ratio sensor 41 does not suffer from deterioration of response, the output air-fuel ratio of the downstream side air-fuel ratio sensor 41 follows a trend as shown in FIG. 6 by the solid line A. That is, after the end of fuel cut control, since there is distance between the engine body 1 to the downstream side air-fuel ratio sensor 41, the output air-fuel ratio of the downstream side air-fuel ratio sensor 41 starts to fall while delayed slightly from the end of fuel cut control. Further, at this time, the air-fuel ratio of the exhaust gas flowing out from the upstream side exhaust purification catalyst 20 becomes substantially the stoichiometric air-fuel ratio, and therefore the output air-fuel ratio of the downstream side air-fuel ratio sensor 41 also converges to substantially the stoichiometric air-fuel ratio.

On the other hand, if the downstream side air-fuel ratio sensor 41 suffers from the abnormality of deterioration of response, the output air-fuel ratio of the downstream side air-fuel ratio sensor 41 follows a trend as shown in FIG. 6 by the broken line B. That is, compared with when the downstream side air-fuel ratio sensor 41 does not suffer from deterioration of response (solid line A), the speed of fall of the output air-fuel ratio becomes slower. In this way, the speed of fall of the output air-fuel ratio of the downstream side air-fuel ratio sensor 41 changes in accordance with any deterioration of response of the downstream side air-fuel ratio sensor 41. For this reason, by calculating this speed of fall, the presence of any deterioration of response of the downstream side air-fuel ratio sensor 41 can be diagnosed. In particular, such deterioration of response is preferably diagnosed based on the speed of fall in the region where the exhaust air-fuel ratio is between 18 or so and 17 or so.

Therefore, in the first embodiment of the present invention, after the end of fuel cut control, during post reset rich control, the speed of change of the output air-fuel ratio (below, referred to as the "speed of change of the judgment use air-fuel ratio") when passing through the inside of a predetermined air-fuel ratio region X where the output air-fuel ratio of the downstream side air-fuel ratio sensor 41 is between 18 or so and 17 or so (below, referred to as "judgment use air-fuel ratio region") is calculated. In particular, in the present embodiment, the time period $\Delta T$ of change of the output air-fuel ratio from the upper limit air-fuel ratio (that is, 18) to the lower limit air-fuel ratio (that is, 17) of the judgment use air-fuel ratio region is used as a parameter expressing the speed of change of the judgment use air-fuel ratio. The longer this time period $\Delta T$ of change of the judgment use air-fuel ratio, the slower the speed of change of the judgment use air-fuel ratio becomes. Note that, in FIG. 1, the time period of change $\Delta T$ of the judgment use air-fuel ratio is a parameter showing the speed of change of the judgment use air-fuel ratio for the solid line A.

Further, in the present embodiment, based on the thus calculated time period $\Delta T$ of change of the judgment use air-fuel ratio, abnormality of the downstream side air-fuel ratio sensor 41 is diagnosed.

Specifically, if the time period $\Delta T$ of change of the judgment use air-fuel ratio is longer than the time period of change of the abnormality criteria, that is, if the speed of change of the judgment use air-fuel ratio is slower than the speed of change of the abnormality criteria, it is judged that the downstream side air-fuel ratio sensor 41 suffers from the abnormality of deterioration of response.

Note that, the time period of change of the abnormality criteria is, for example, made a time period slightly longer than the minimum time of the time period of change in the judgment use air-fuel ratio region X when the downstream side air-fuel ratio sensor 41 does not suffer from deterioration of response. Further, the time period of change of the abnormality criteria may be a predetermined value or may be a value which changes in accordance with operating parameters such as the engine speed or engine load during post reset rich control.

Conversely, when the time period $\Delta T$ of change of the judgment use air-fuel ratio is shorter than the time period of change of the abnormality criteria, that is, when the corrected speed of change of the air-fuel ratio is faster than the speed of change of the abnormality criteria, it is judged that the downstream side air-fuel ratio sensor 41 does not suffer from the abnormality of deterioration of response and the downstream side air-fuel ratio sensor 41 is normal.

According to the diagnosis system of the present embodiment, when the air-fuel ratio of the exhaust gas passing around the downstream side air-fuel ratio sensor 41 changes from the state where fuel cut control is performed, that is, the state where the air-fuel ratio of the exhaust gas passing around the downstream side air-fuel ratio sensor 41 is extremely high (lean degree is extremely high), to the stoichiometric air-fuel ratio, diagnosis of abnormality is performed. In this way, by diagnosing abnormality when the air-fuel ratio of the exhaust gas passing around the downstream side air-fuel ratio sensor 41 greatly changes, it is possible to reduce the effects of noise of the downstream side air-fuel ratio sensor 41 and possible to raise the precision of diagnosis of abnormality.

Further, if fuel cut control is performed, the air-fuel ratio of the exhaust gas passing around the downstream side air-fuel ratio sensor 41 is maintained at an extremely high air-fuel ratio. For this reason, in diagnosing abnormality after the end of fuel cut control, the effects of fluctuation of the air-fuel ratio before diagnosis of abnormality can be eliminated. Further, during fuel cut control, the oxygen storage amount of the upstream side exhaust purification catalyst 20 basically reaches the upper limit storage amount, and therefore in diagnosis of abnormality, the effect of the oxygen storage amount can also be eliminated. For this reason, according to the diagnosis system of the present embodiment, it is possible to diagnose abnormality of the downstream side air-fuel ratio sensor 41 with a high precision. Further, according to the diagnosis system of the present embodiment, there is no need to prohibit diagnosis of abnormality in consideration of the fluctuations of the air-fuel ratio before diagnosis of abnormality and the oxygen storage amount of the upstream side exhaust purification catalyst 20. It is possible to diagnose abnormality just when diagnosis of abnormality is considered necessary.

Note that, in the present embodiment, the vehicle mounting the internal combustion engine is configured to turn on a warning light when the diagnosis system judges that the downstream side air-fuel ratio sensor 41 is abnormal.

Further, in the above embodiment, an abnormality is diagnosed based on the time period $\Delta T$ of change of the judgment use air-fuel ratio. However, instead of the time period $\Delta T$ of change of the judgment use air-fuel ratio, the speed of change $V_1$ of the air-fuel ratio, obtained by subtracting from the upper limit air-fuel ratio of the judgment use air-fuel ratio region X the lower limit air-fuel ratio and dividing the resultant value by the time period of change of the judgment use air-fuel ratio may also be used.

Alternatively, instead of the time period $\Delta T$ of change of the judgment use air-fuel ratio, it is also possible to use the integrated value of the amount of exhaust gas passing the downstream side air-fuel ratio sensor 41 in the interval from when the output air-fuel ratio changes from the upper limit air-fuel ratio of the judgment use air-fuel ratio region to the lower limit air-fuel ratio. The integrated value of the amount of exhaust gas may also be estimated from the output value of the air flowmeter 39 or may be estimated from the engine load and the engine speed.

Furthermore, in the above embodiment, after engine startup until engine stop, the diagnosis of abnormality is only performed one time. However, it is also possible to have the diagnosis of abnormality performed several times after engine start until engine stop. Further, in the above embodiment, if, in one diagnosis of abnormality, the time period ΔT of change of the judgment use air-fuel ratio is longer than the time period of change of the abnormality criteria, it is diagnosed that the upstream side exhaust purification catalyst 20 is abnormal. However, it may also be diagnosed that the upstream side exhaust purification catalyst 20 is abnormal if it is judged that the time period ΔT of change of the judgment use air-fuel ratio is longer than the time period of change of the abnormality criteria consecutively for two abnormality diagnoses. In this case, for example, even if the diagnosis of abnormality results in judgment one time that the time period ΔT of change of the judgment use air-fuel ratio is longer than the time period of change of the abnormality criteria, if in the diagnosis of abnormality after that, it is judged that the time period ΔT of change of the judgment use air-fuel ratio is shorter than the time period of change of the abnormality criteria, it is diagnosed that the downstream side air-fuel ratio sensor 41 is normal.

<Judgment Use Air-Fuel Ratio Region>

In this regard, if the judgment use air-fuel ratio region is made a region between the upper limit air-fuel ratio and the richer side lower limit air-fuel ratio, in the above-explained example, the upper limit air-fuel ratio is made 18 and the lower limit air-fuel ratio is made 17. However, the judgment use air-fuel ratio region does not necessarily have to be a region between these.

Here, the judgment use air-fuel ratio region basically has to be a region where the speed of change of the output air-fuel ratio changes when the downstream side air-fuel ratio sensor 41 suffers from deterioration of response. Therefore, the judgment use upper limit air-fuel ratio has to be lower than the output air-fuel ratio when fuel cut control causes air to be discharged from the upstream side exhaust purification catalyst 20.

In addition, when using as the downstream side air-fuel ratio sensor 41, as explained above, a limit current type air-fuel ratio sensor, the upper limit air-fuel ratio has to be an air-fuel ratio by which the downstream side air-fuel ratio sensor 41 can generate a limit current. For example, in the example shown in FIG. 3, when the applied voltage in the downstream side air-fuel ratio sensor 41 is made 0.4V, the limit current is output if the exhaust air-fuel ratio is 18 or so, but if the exhaust air-fuel ratio becomes that or more, the limit current will not be output. If in this way the limit current is no longer output, the precision of the output current with respect to the actual air-fuel ratio deteriorates, and therefore the precision of detection of the air-fuel ratio falls. Therefore, the upper limit air-fuel ratio is made an air-fuel ratio by which the downstream side air-fuel ratio sensor 41 can generate the limit current. In the air-fuel ratio sensor having the V-I characteristic shown in FIG. 3, it is made 18 or less.

Figure 7:
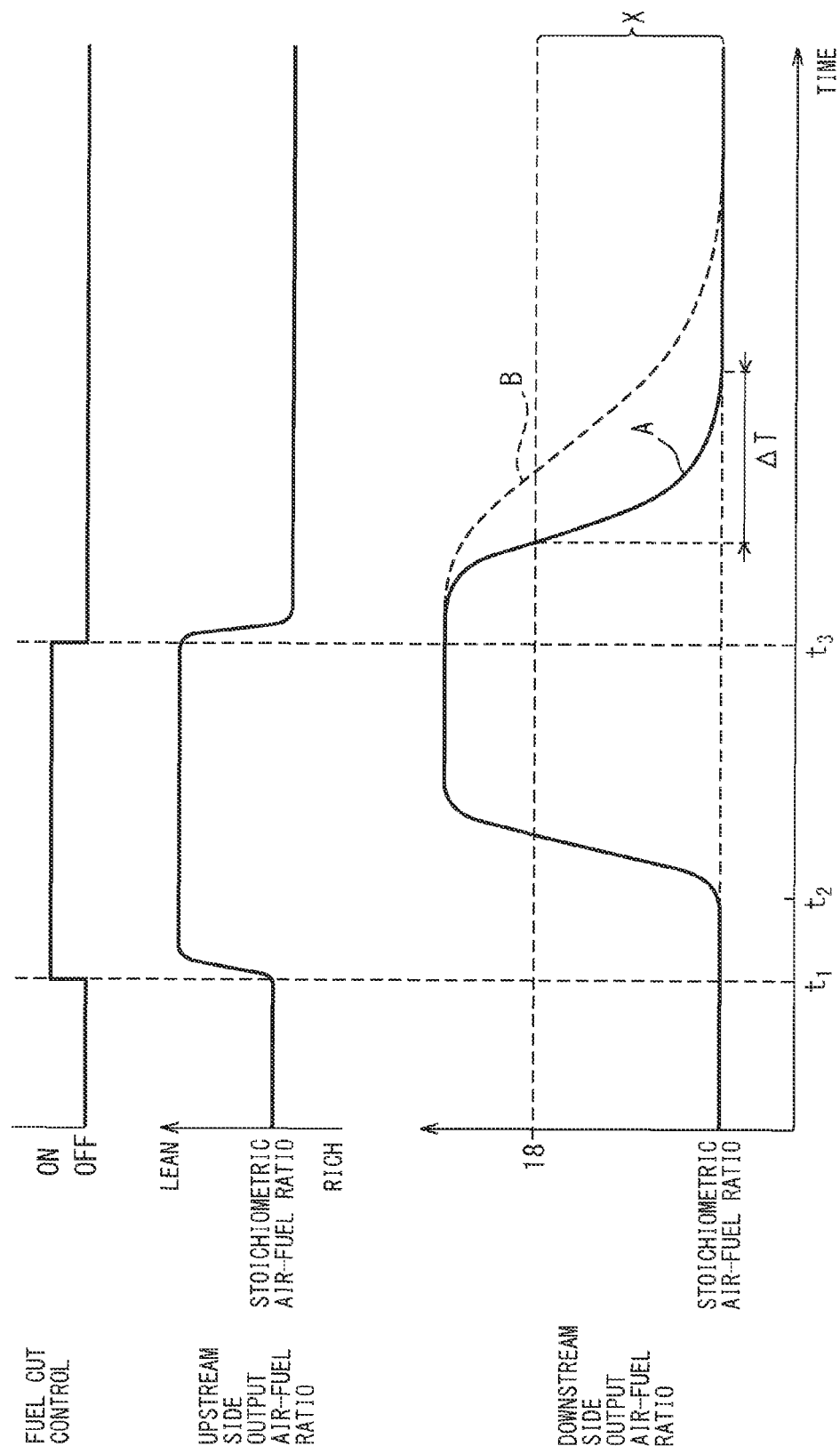
FIG. 7 is a time chart of an upstream side output air-fuel ratio, downstream side output air-fuel ratio, etc. before and after fuel cut control.

Further, the timing at which the air-fuel ratio of the exhaust gas flowing out from the upstream side exhaust purification catalyst 20 becomes richer than the stoichiometric air-fuel ratio changes according to the amount of oxygen which can be stored by the upstream side exhaust purification catalyst 20 (maximum oxygen storage amount). Therefore, if the lower limit air-fuel ratio is set richer than the stoichiometric air-fuel ratio, even if the deterioration of response of the downstream side air-fuel ratio sensor 41 is of the same extent, the timing changes in accordance with the maximum oxygen storage amount of the upstream side exhaust purification catalyst 20. Therefore, the lower limit air-fuel ratio has to be the stoichiometric air-fuel ratio or more. For this reason, the judgment use air-fuel ratio region can be said to be a part of the air-fuel ratio region of the stoichiometric air-fuel ratio or more. Note that, for example, when making the lower limit air-fuel ratio the stoichiometric air-fuel ratio, the time period ΔT of change of the judgment use air-fuel ratio becomes the time period such as shown in FIG. 7. However, the lower limit air-fuel ratio is preferably leaner than the stoichiometric air-fuel ratio.

In addition, when using as the downstream side air-fuel ratio sensor 41, as explained above, a limit current type air-fuel ratio sensor, the lower limit air-fuel ratio also must be an air-fuel ratio by which the downstream side air-fuel ratio sensor 41 can generate a limit current. Therefore, in an air-fuel ratio sensor having a V-I characteristic shown in FIG. 3, it is made 12 or more. Note that, if considering the point that both the upper limit air-fuel ratio and the lower limit air-fuel ratio have to be air-fuel ratios by which the downstream side air-fuel ratio sensor 41 can generate a limit current, the judgment use air-fuel ratio region can be said to be a region in the air-fuel ratio region where the downstream side air-fuel ratio sensor 41 can generate the limit current.

Due to the above, if making the judgment use air-fuel ratio region a region between the upper limit air-fuel ratio and the lower limit air-fuel ratio, in the above example, the upper limit air-fuel ratio is made 18 and the lower limit air-fuel ratio is made 17.

<Flow Chart>

Figure 8:
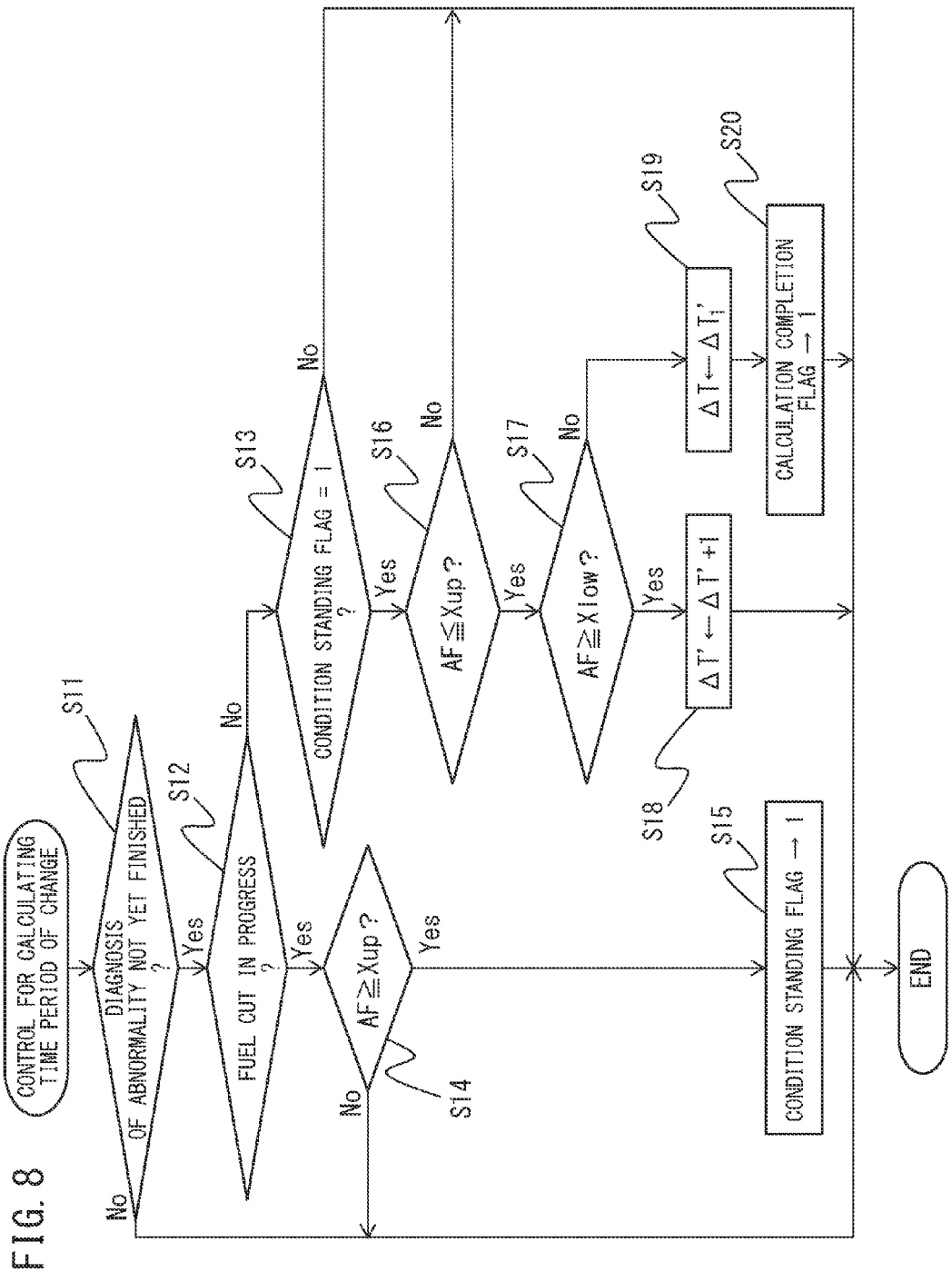
FIG. 8 is a flow chart which shows a control routine for control for calculating a time period of change.

FIG. 8 is a flow chart showing a control routine of control for calculating a time period of change. The illustrated control routine is performed by interruption every certain time interval.

First, at step S11, it is judged whether diagnosis of abnormality has still not yet been performed after startup of the internal combustion engine (or after the ignition key of the vehicle mounting the internal combustion engine is turned ON). If the diagnosis of abnormality has already ended, it is not necessary to calculate the time period of change for the diagnosis of abnormality, and therefore the control routine is made to end. On the other hand, if at step S11 it is judged that the diagnosis of abnormality has not yet ended, the routine proceeds to step S12.

Next, at step S12, it is judged if the engine is currently in the middle of fuel cut control. If fuel cut control is still not performed, the routine proceeds to step S13. At step S13, it is judged if a condition standing flag is "1". The condition standing flag is a flag which is made "1" when the condition for execution of calculation of the time period of change stands and is made "0" when it does not stand. When fuel cut control is not yet performed, the condition for execution of calculation of the time period of change does not stand, and therefore the control routine is made to end.

After that, if fuel cut control is performed, the routine proceeds from step S12 to step S14. At step S14, it is judged if the output air-fuel ratio AF of the downstream side air-fuel ratio sensor 41 is the upper limit air-fuel ratio Xup of the judgment use air-fuel ratio region X or more. If it is judged that the output air-fuel ratio AF of the downstream side air-fuel ratio sensor 41 is lower than the upper limit air-fuel ratio Xup, the time period of change in the judgment use air-fuel ratio region X cannot be calculated, and therefore the control routine is ended. On the other hand, if it is judged at step S14 that the output air-fuel ratio AF of the downstream side air-fuel ratio sensor 41 is the upper limit air-fuel ratio Xup or more, the routine proceeds to step S15. At step S15, the condition standing flag is made "1".

After that, if fuel cut control is ended, the routine proceeds from step S12 to step S13 again. At step S13, it is judged that the condition standing flag is "1", then the routine proceeds to step S16 to calculate the time period of change. At step S16, it is judged if the output air-fuel ratio AF of the downstream side air-fuel ratio sensor 41 is the upper limit air-fuel ratio Xup of the judgment use air-fuel ratio region X or less.

If at step S16 it is judged that the output air-fuel ratio AF is larger than the upper limit air-fuel ratio Xup, the control routine is made to end.

After that, if the output air-fuel ratio AF becomes the upper limit air-fuel ratio Xup or less, at the next control routine, the routine proceeds from step S16 to step S17. At step S17, it is judged if the output air-fuel ratio AF of the downstream side air-fuel ratio sensor 41 is the lower limit air-fuel ratio Xlow of the judgment use air-fuel ratio region X or more. While the output air-fuel ratio AF of the downstream side air-fuel ratio sensor 41 is within the judgment use air-fuel ratio region X, it is judged at step S17 that the output air-fuel ratio AF is the lower limit air-fuel ratio Xlow or more and the routine proceeds to step S18. At step S18, the provisional time period ΔT' of change of the air-fuel ratio is incremented by "1". While the output air-fuel ratio AF is within the judgment use air-fuel ratio region X, the routine repeatedly proceeds to step S18, and therefore during this time, the provisional time period ΔT' of change of the air-fuel ratio is increased. As a result, at step S18, the time period elapsed from when the output air-fuel ratio AF enters the judgment use air-fuel ratio region X is calculated.

After that, if the output air-fuel ratio AF of the downstream side air-fuel ratio sensor 41 becomes the lower limit air-fuel ratio Xlow or less, at the next control routine, the routine proceeds from step S17 to step S19. At step S19, the provisional time period ΔT' of change of the air-fuel ratio at this time is made the time period ΔT of change of the judgment use air-fuel ratio. Next, at step S20, a calculation completion flag is set to "1". Note that, the calculation completion flag is a flag set to "0" until calculation of the time period ΔT is completed and set to "1" when the calculation is completed.

Note that, in the above control routine, the time period of change of the judgment use air-fuel ratio is calculated if the diagnosis of abnormality has not yet ended and if the output air-fuel ratio AF of the downstream side air-fuel ratio sensor 41 during fuel cut control is the upper limit air-fuel ratio Xup of the judgment use air-fuel ratio region X or more. Therefore, in fact, these function as conditions for execution of calculation of the time period of change. Further, the conditions for execution of calculation of the time period of change are not limited to these. For example, instead of the condition for execution that the output air-fuel ratio AF be the upper limit air-fuel ratio Xup or more during fuel cut control, the elapsed time from the start of fuel cut control being a predetermined threshold value or more or the integrated value of the amount of intake air from the start of fuel cut control being a predetermined threshold value or more may be made conditions for execution. Further, so long as the time period of change of the judgment use air-fuel ratio is not calculated, the downstream side air-fuel ratio sensor 41 also not diagnosed for abnormality, and therefore the above-mentioned conditions for execution of calculation of the time period of change can be said to be conditions for execution of diagnosis of abnormality.

Figure 9:
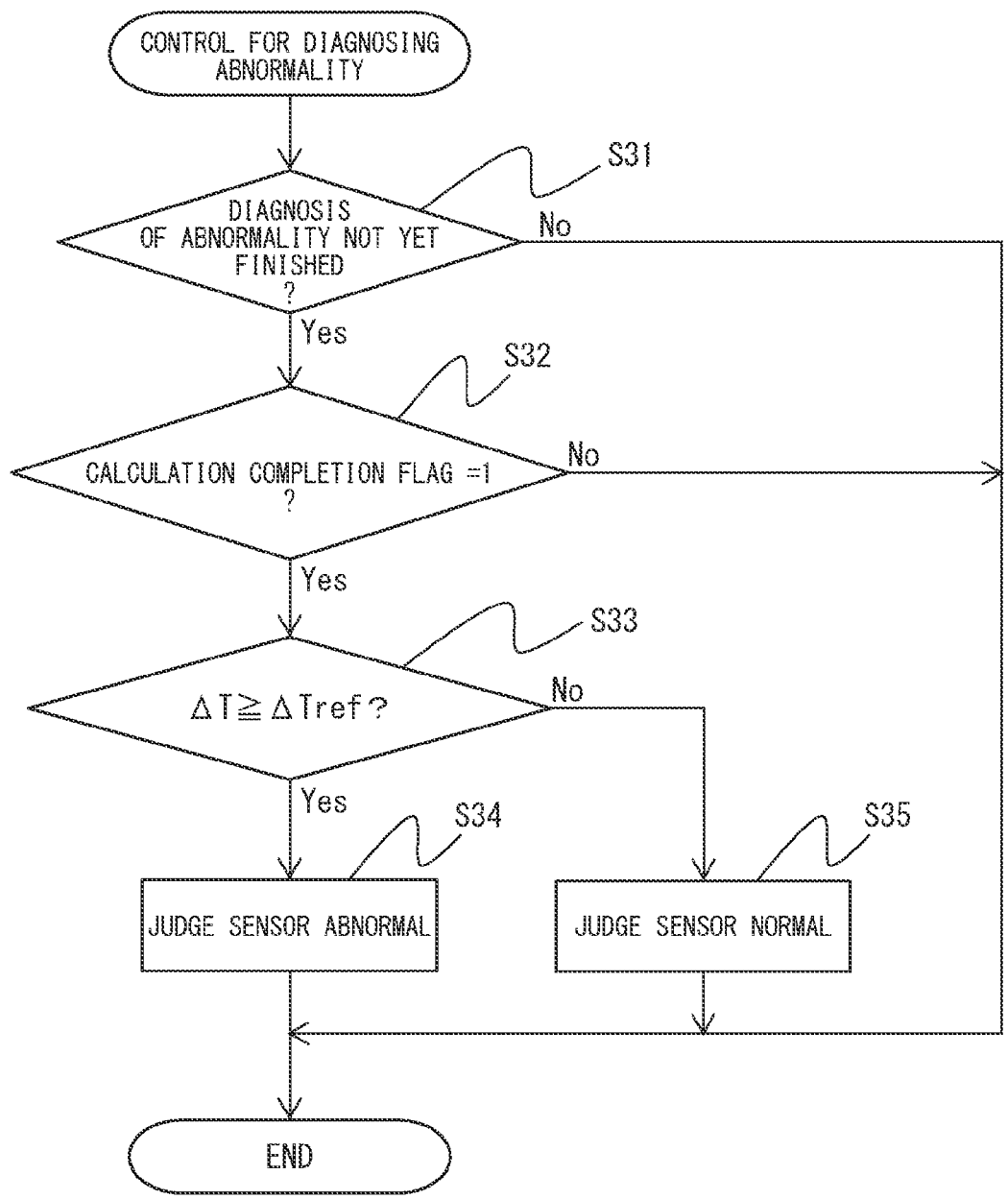
FIG. 9 is a flow chart which shows a control routine for control for diagnosing abnormality.

FIG. 9 is a flow chart showing a control routine of control for diagnosis of abnormality. The illustrated control routine is performed by interruption every certain time interval. In the control for diagnosis of abnormality, the time period ΔT of change of the judgment use air-fuel ratio calculated by the control for calculating the time period of change shown in FIG. 8 is utilized.

As shown in FIG. 9, first, at step S31, it is judged if diagnosis of abnormality has not yet ended. If the diagnosis of abnormality has already ended, since there is no need to again diagnose abnormality, the control routine is made to end. On the other hand, if, at step S31, it is judged that the diagnosis of abnormality has ended, the routine proceeds to step S32.

At step S32, it is judged if the calculation completion flag is "1". Until the calculation completion flag is set to "1" in step S20 in FIG. 8, it is assumed that the calculation completion flag is not "1" and the control routine is made to end. On the other hand, if the calculation completion flag is set to "1", the routine proceeds to step S33.

At step S33, it is judged if the time period ΔT of change of the judgment use air-fuel ratio is the time period ΔTref of change used as reference for abnormality or more. If it is judged that the time period ΔT of change of the judgment use air-fuel ratio is the time period ΔTref of change used as reference for abnormality or more, the routine proceeds to step S34 where it is judged that the downstream side air-fuel ratio sensor 41 suffers from the abnormality of deterioration of response. On the other hand, when it is judged that the time period $\Delta T_1$ of change of the judgment use air-fuel ratio is smaller than the time period ΔTref of change used as reference for abnormality, the routine proceeds to step S35 where it is judged that the downstream side air-fuel ratio sensor 41 does not suffer from deterioration of response and is normal.

Note that, the condition standing flag and calculation completion flag shown in FIG. 8 and FIG. 9 are, for example, reset to 0 when the ignition key of the vehicle mounting the internal combustion engine is turned OFF.

<Second Embodiment>

Next, referring to FIG. 10, a diagnosis system according to a second embodiment of the present invention will be explained. The diagnosis system according to the second embodiment is basically configured in the same way as the diagnosis system according to the first embodiment. However, in the first embodiment, abnormality is diagnosed based on the speed of change of the output air-fuel ratio of the downstream side air-fuel ratio sensor 41 (time period of change), while in the second embodiment, abnormality is diagnosed based on the integrated value of the output air-fuel ratio of the downstream side air-fuel ratio sensor 41 is used as the basis for the diagnosis of abnormality.

Regarding the presence or absence of deterioration of response of the output air-fuel ratio of the downstream side air-fuel ratio sensor 41, the integrated value of the output air-fuel ratio follows a similar trend as the speed of change of the air-fuel ratio. This situation is shown in FIG. 10.

Figure 10:
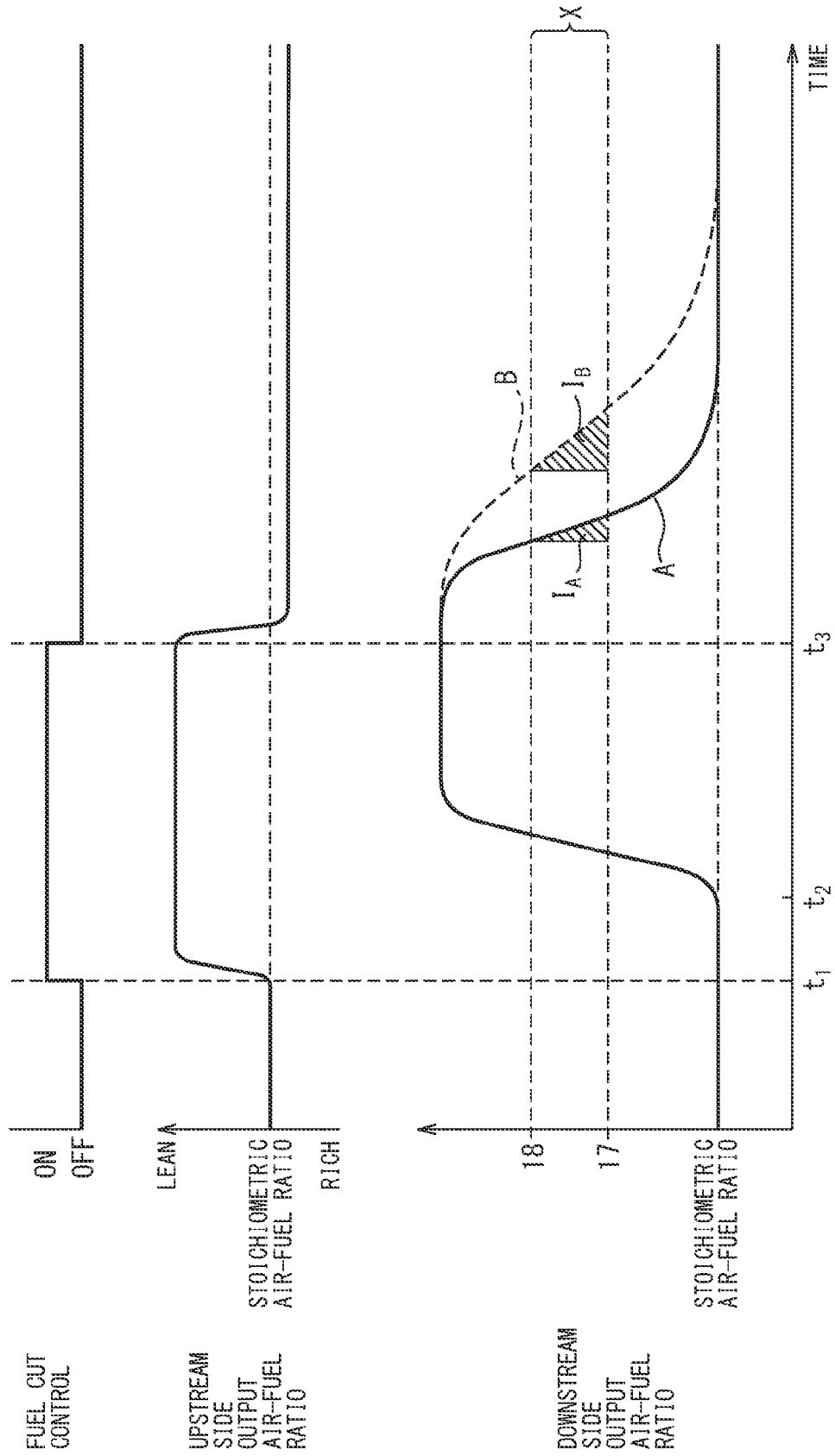
FIG. 10 is a time chart of an upstream side output air-fuel ratio and downstream side output air-fuel ratio etc. before and after fuel cut control.

FIG. 10 is a time chart like FIG. 6. In FIG. 10, $I_A$ is the integrated value of the output air-fuel ratio when the output air-fuel ratio first passes through the inside of the judgment use air-fuel ratio region X if the downstream side air-fuel ratio sensor 41 does not suffer from deterioration of response (solid line A). Further, in FIG. 10, $I_B$ is the integrated value of the output air-fuel ratio when the output air-fuel ratio first passes through the inside of the judgment use air-fuel ratio region X if the downstream side air-fuel ratio sensor 41 suffers from deterioration of response (solid line B).

If comparing these integrated values $I_A$, $I_B$, the integrated value $I_B$ is larger than the integrated value $I_A$. Therefore, if the downstream side air-fuel ratio sensor 41 suffers from deterioration of response, it is learned that the integrated value of the output air-fuel ratio when passing through the inside of the judgment use air-fuel ratio region X (below, referred to as the "integrated value of the judgment use air-fuel ratio") becomes larger. Therefore, it is learned that the integrated value of the judgment use air-fuel ratio also follows a similar trend as the speed of change of the judgment use air-fuel ratio in accordance with the presence or absence of deterioration of response of the downstream side air-fuel ratio sensor 41.

Therefore, in the present embodiment, based on the integrated value of the judgment use air-fuel ratio, abnormality of the downstream side air-fuel ratio sensor 41 is diagnosed. Specifically, when the integrated value of the judgment use air-fuel ratio is an integrated value used as reference for abnormality or more, it is judged that the downstream side air-fuel ratio sensor 41 suffers from the abnormality of deterioration of response. Conversely, when the integrated value of the judgment use air-fuel ratio is smaller than the integrated value used as reference for abnormality, it is judged that the downstream side air-fuel ratio sensor 41 does not suffer from the abnormality of deterioration of response. Due to this, the diagnosis system of the present embodiment, like the diagnosis system of the first embodiment, can diagnose abnormality of the downstream side air-fuel ratio sensor 41 with a high precision.

If expressing the above-mentioned first embodiment and second embodiment together, according to the present invention, a characteristic of change of an air-fuel ratio is calculated based on the output air-fuel ratio output from the downstream side air-fuel ratio sensor 41 when the output air-fuel ratio first passes through a part of an air-fuel ratio region of the stoichiometric air-fuel ratio or more after the end of the fuel cut control, and abnormality of the downstream side air-fuel ratio sensor 41 is diagnosed based on this characteristic of change of the air-fuel ratio. The "characteristic of change of the air-fuel ratio" means the extent by which another parameter changes while the output air-fuel ratio changes by a predetermined amount or the extent by which the output air-fuel ratio changes while a parameter other than the output air-fuel ratio changes by a predetermined amount. As the characteristic of change of the air-fuel ratio, specifically, in the above-mentioned embodiment, the time period of change of the judgment use air-fuel ratio (speed of change of air-fuel ratio), the integrated value of the air-fuel ratio, the integrated value of the amount of exhaust gas passing through the downstream side air-fuel ratio sensor 41 while the output air-fuel ratio changes from the upper limit air-fuel ratio of the judgment use air-fuel ratio region to the lower limit air-fuel ratio, etc. may be mentioned.

<Third Embodiment>

Next, referring to FIG. 11, a diagnosis system according to a third embodiment of the present invention will be explained. The diagnosis system according to the third embodiment basically is configured in the same way as the diagnosis systems according to the first embodiment and second embodiment. However, in the first embodiment and the second embodiment, after the end of fuel cut control, the target air-fuel ratio is made a post reset rich air-fuel ratio richer than the stoichiometric air-fuel ratio, but in the third embodiment, after the end of fuel cut control, the target air-fuel ratio is made the stoichiometric air-fuel ratio (second air-fuel ratio) before being made the post reset rich air-fuel ratio.

<Issues in Diagnosis of Deterioration of Response>

In this regard, the trend in the output air-fuel ratio of the downstream side air-fuel ratio sensor 41 after the end of fuel cut control also changes in accordance with the degree of deterioration of the upstream side exhaust purification catalyst 20. For example, if the degree of deterioration of the upstream side exhaust purification catalyst 20 is high and the oxygen storage ability falls, even during fuel cut control, the upstream side exhaust purification catalyst 20 does not store much oxygen at all. For this reason, if the fuel cut control ends and the air-fuel ratio of the exhaust gas flowing into the upstream side exhaust purification catalyst 20 is made the rich air-fuel ratio, along with this, the air-fuel ratio of the exhaust gas flowing out from the upstream side exhaust purification catalyst 20 also rapidly falls.

Figure 11:
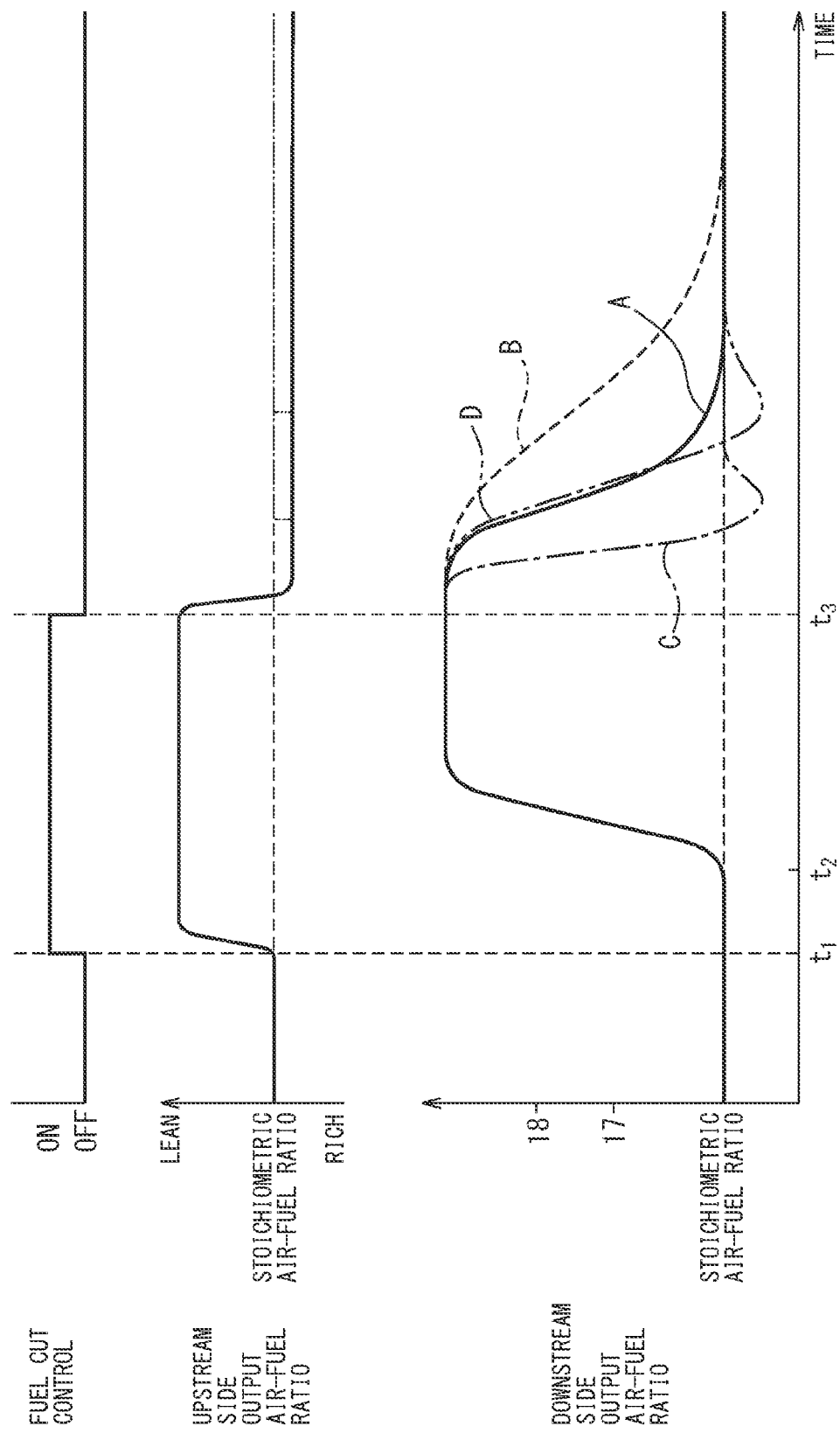
FIG. 11 is a time chart of an upstream side output air-fuel ratio and downstream side output air-fuel ratio etc. before and after fuel cut control.

FIG. 11 is a time chart, similar to FIG. 6, of the upstream side output air-fuel ratio and downstream side output air-fuel ratio before and after fuel cut control. In FIG. 11, the one-dot chain line C expresses the trend in the output air-fuel ratio in the case where the downstream side air-fuel ratio sensor 41 does not suffer from deterioration of response and the degree of deterioration of the upstream side exhaust purification catalyst 20 is high. As will be understood from a comparison of the solid line A and one-dot chain line C of FIG. 11, after the end of fuel cut control, the speed of fall of the output air-fuel ratio of the downstream side air-fuel ratio sensor 41 becomes faster than the case where the upstream side exhaust purification catalyst 20 has not deteriorated.

On the other hand, if the downstream side air-fuel ratio sensor 41 suffers from deterioration of response and the degree of deterioration of the upstream side exhaust purification catalyst 20 is high, the decrease in the speed of fall of the output air-fuel ratio accompanying deterioration of response and the increase in the speed of fall of the output air-fuel ratio accompanying deterioration of the upstream side exhaust purification catalyst 20 are matched. As a result, in such a case, the output air-fuel ratio of the downstream side air-fuel ratio sensor 41, as shown in FIG. 11 by the two-dot chain line D, follows the same trend as the output air-fuel ratio in the case of the solid line A (case where downstream side air-fuel ratio sensor 41 does not suffer from deterioration of response and degree of deterioration of the upstream side exhaust purification catalyst 20 is low) in the region of the exhaust air-fuel ratio between 18 or so and 17 or so.

For this reason, if, as explained above, deterioration of response is diagnosed based on the speed of fall of the output air-fuel ratio, in the case shown in FIG. 11 by the two-dot chain line D, it is not possible to judge abnormality regardless of the downstream side air-fuel ratio sensor 41 suffering from the abnormality of deterioration of response.

<Principle of Diagnosis of Abnormality in Present Invention>

Therefore, in the present embodiment, when diagnosing abnormality of the downstream side air-fuel ratio sensor 41, post reset rich control is not performed right after the end of fuel cut control. First, the target air-fuel ratio is made the stoichiometric air-fuel ratio, then post reset rich control is performed after the end of the diagnosis of abnormality. That is, in the present embodiment, when diagnosing abnormality of the downstream side air-fuel ratio sensor 41, after the end of fuel cut control, the target air-fuel ratio is first set to the stoichiometric air-fuel ratio and after that, after the end of the abnormality of diagnosis, is set to the post reset rich air-fuel ratio. On the other hand, when not diagnosing abnormality of the downstream side air-fuel ratio sensor 41, post reset rich control is performed right after the end of fuel cut control.

Figure 12:
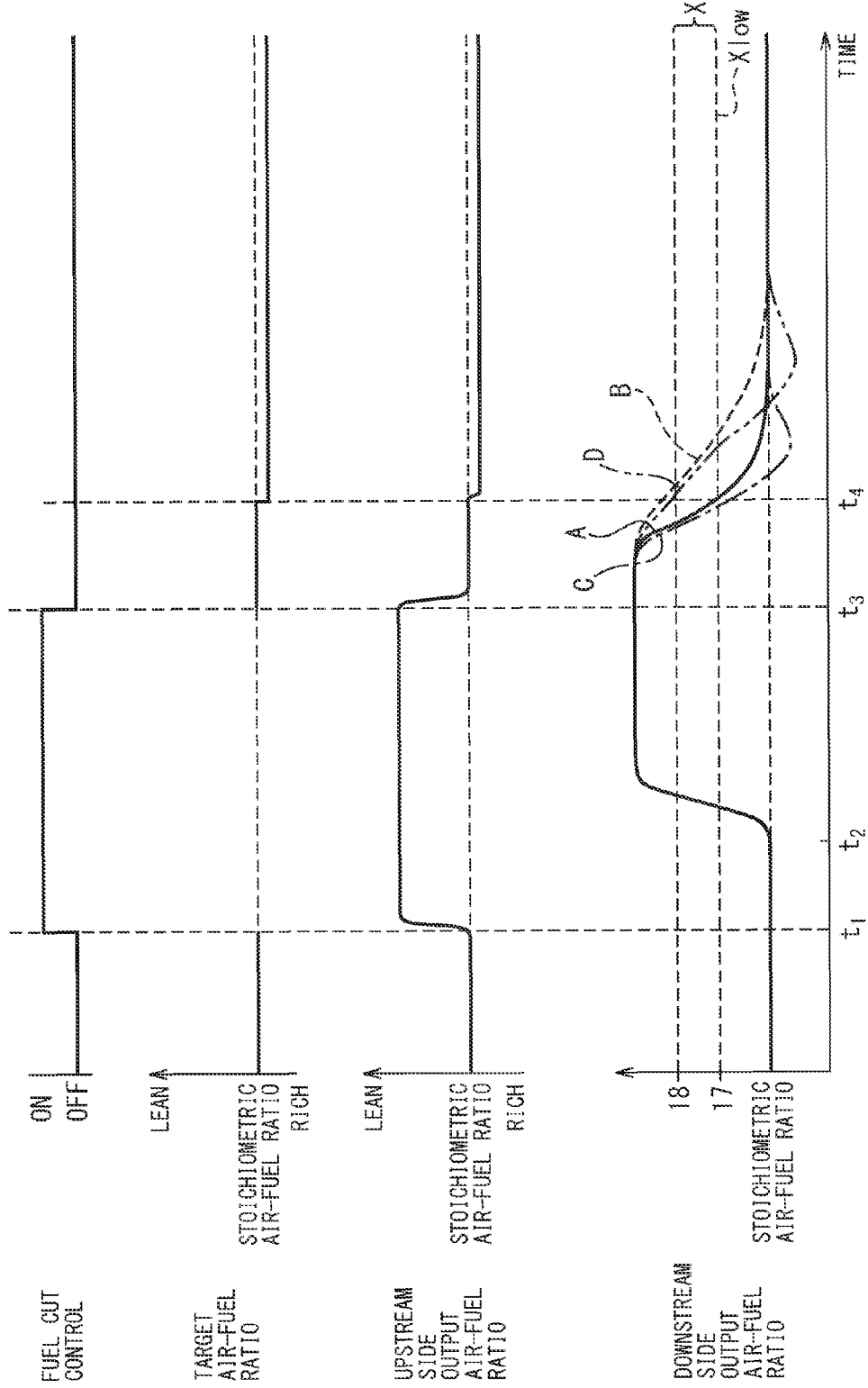
FIG. 12 is a time chart of a downstream side output air-fuel ratio etc. when controlling a target air-fuel ratio based on the third embodiment.

FIG. 12 is a time chart of the downstream side output air-fuel ratio etc. when controlling the target air-fuel ratio based on the present embodiment (for the target air-fuel ratio and upstream side output air-fuel ratio, only the case corresponding to the solid line A is shown). In FIG. 12 as well, in the same way as FIG. 6 etc., the fuel cut control is started at the time $t_1$ and the fuel cut control is ended at the time $t_3$. Below, first, the case of the solid line A (case where the downstream side air-fuel ratio sensor 41 does not suffer from the abnormality of deterioration of response and the degree of deterioration of the upstream side exhaust purification catalyst 20 is low) will be referred to so as to explain control of the target air-fuel ratio in the present embodiment.

As shown in FIG. 12, in the present embodiment, when diagnosing abnormality of the downstream side air-fuel ratio sensor 41, if fuel cut control is made to end at the time $t_3$, the target air-fuel ratio of the exhaust gas flowing into the upstream side exhaust purification catalyst 20 is set to the stoichiometric air-fuel ratio. Along with this, the output air-fuel ratio of the upstream side air-fuel ratio sensor 40 changes to the stoichiometric air-fuel ratio. Further, the air-fuel ratio of the exhaust gas flowing into the upstream side exhaust purification catalyst 20 is the stoichiometric air-fuel ratio, and therefore in the upstream side exhaust purification catalyst 20, no reaction of the unburned gas or oxygen occurs. For this reason, the air-fuel ratio of the exhaust gas flowing out from the upstream side exhaust purification catalyst 20 also changes toward the stoichiometric air-fuel ratio. Therefore, the output air-fuel ratio of the downstream side air-fuel ratio sensor 41 shown by the solid line A also changes toward the stoichiometric air-fuel ratio and passes through the judgment use air-fuel ratio region X before the time $t_4$.

At the time $t_4$, the output air-fuel ratio of the downstream side air-fuel ratio sensor 41 passes through the judgment use air-fuel ratio region X, and therefore at this point of time, the speed of fall of the output air-fuel ratio when the output air-fuel ratio passes through the judgment use air-fuel ratio region X can be calculated. Therefore, in the present embodiment, when the output air-fuel ratio of the downstream side air-fuel ratio sensor 41 passes through the judgment use air-fuel ratio region X, the target air-fuel ratio is changed from the stoichiometric air-fuel ratio to the post reset rich air-fuel ratio. In other words, according to the present embodiment, when the target air-fuel ratio is set to the stoichiometric air-fuel ratio after the end of fuel cut control and the output air-fuel ratio of the downstream side air-fuel ratio sensor 41 reaches the lower limit air-fuel ratio Xlow of the judgment use air-fuel ratio region X (in the illustration, 17), the target air-fuel ratio is changed to the post reset rich air-fuel ratio so as to perform the post reset rich control. Along with this, the output air-fuel ratio of the upstream side air-fuel ratio sensor 40 becomes the rich air-fuel ratio.

As will be understood from FIG. 12, when the downstream side air-fuel ratio sensor 41 does not suffer from the abnormality of deterioration of response and the degree of deterioration of the upstream side exhaust purification catalyst 20 is low (solid line A of FIG. 12), if controlling the target air-fuel ratio after the end of fuel cut control as explained above, the output air-fuel ratio will follow the same trend as the solid line A shown in FIG. 11. That is, if the degree of deterioration of the upstream side exhaust purification catalyst 20 is low, even if the target air-fuel ratio is the rich air-fuel ratio, excessive unburned gas is removed by oxidation at the upstream side exhaust purification catalyst 20, and therefore the exhaust gas reaching the downstream side air-fuel ratio sensor 41 becomes the stoichiometric air-fuel ratio. Therefore, both when setting the target air-fuel ratio to the stoichiometric air-fuel ratio after the end of fuel cut control or making it the rich air-fuel ratio, the downstream side air-fuel ratio sensor 41 has exhaust gas of a similar air-fuel ratio flow into it. As a result, both when making the target air-fuel ratio the rich air-fuel ratio after the end of fuel cut control and when, like in the present embodiment, setting the target air-fuel ratio to the stoichiometric air-fuel ratio, the output air-fuel ratio of the downstream side air-fuel ratio sensor 41 follows the same trend.

Similarly, if controlling the target air-fuel ratio after the end of fuel cut control as explained above when the downstream side air-fuel ratio sensor 41 suffers from the abnormality of deterioration of response and the degree of deterioration of the upstream side exhaust purification catalyst 20 is low (in FIG. 12, the broken line B), the output air-fuel ratio follows the same trend as the broken line B shown in FIG. 11. This is also because after the end of fuel cut control, both when setting the target air-fuel ratio to the stoichiometric air-fuel ratio and when setting it to the rich air-fuel ratio, similar air-fuel ratio exhaust gas flows into the downstream side air-fuel ratio sensor 41.

On the other hand, if setting the target air-fuel ratio as explained above when the degree of deterioration of the upstream side exhaust purification catalyst 20 is high, the output air-fuel ratio of the downstream side air-fuel ratio sensor 41 follows a different trend from when setting the target air-fuel ratio to the rich air-fuel ratio after the end of fuel cut control. In FIG. 12, the one-dot chain line C expresses the trend in the output air-fuel ratio when controlling the target air-fuel ratio if the downstream side air-fuel ratio sensor 41 does not suffer from deterioration of response and the degree of deterioration of the upstream side exhaust purification catalyst 20 is high.

As will be understood from FIG. 12, in the period from when the fuel cut control is made to end at the time $t_3$ to when the output air-fuel ratio passes through the judgment use air-fuel ratio region X, the one-dot chain line C follows the same trend as the solid line A. That is, if the air-fuel ratio of the exhaust gas flowing into the upstream side exhaust purification catalyst 20 is the stoichiometric air-fuel ratio, regardless of the degree of deterioration of the upstream side exhaust purification catalyst 20, at the upstream side exhaust purification catalyst 20, the unburned gas and oxygen are not reacted and the oxygen is not stored or released. For this reason, the stoichiometric air-fuel ratio exhaust gas flowing into the upstream side exhaust purification catalyst 20 flows out from the upstream side exhaust purification catalyst 20 as is regardless of the degree of deterioration of the upstream side exhaust purification catalyst 20. As a result, even if the degree of deterioration of the upstream side exhaust purification catalyst 20 is high while the output air-fuel ratio is passing through the judgment use air-fuel ratio region X, the output air-fuel ratio of the downstream side air-fuel ratio sensor 41 follows the same trend as when the degree of deterioration is low.

Note that, as explained above, in the present embodiment, if the output air-fuel ratio of the downstream side air-fuel ratio sensor 41 reaches the lower limit air-fuel ratio Xlow of the judgment use air-fuel ratio region X, the target air-fuel ratio is changed to the post reset rich air-fuel ratio so as to perform post reset rich control. For this reason, as will be understood from FIG. 12, in the case shown by the one-dot chain line C, if the output air-fuel ratio of the downstream side air-fuel ratio sensor 41 becomes smaller than the lower limit air-fuel ratio Xlow, the speed of fall of the output air-fuel ratio becomes faster compared with the case shown by the solid line A.

Further, the two-dot chain line D of FIG. 12 shows the trend in the output air-fuel ratio when the above control of the target air-fuel ratio is performed if the downstream side air-fuel ratio sensor 41 suffers from deterioration of response and the degree of deterioration of the upstream side exhaust purification catalyst 20 is high. As will be understood from FIG. 12, the two-dot chain line D from when the fuel cut control is made to end at the time $t_3$ to when the output air-fuel ratio passes through the judgment use air-fuel ratio region X follows the same trend as the broken line B. This is also because if making the air-fuel ratio of the exhaust gas flowing into the upstream side exhaust purification catalyst 20 the stoichiometric air-fuel ratio, the inflowing exhaust gas flows out from the upstream side exhaust purification catalyst 20 as is regardless of the degree of deterioration of the upstream side exhaust purification catalyst 20. Note that, in the present embodiment, if the output air-fuel ratio reaches the lower limit air-fuel ratio Xlow, the target air-fuel ratio is changed to the post reset rich air-fuel ratio. For this reason, even in the case shown by the two-dot chain line D, if the output air-fuel ratio is smaller than the lower limit air-fuel ratio Xlow, the speed of fall of the output air-fuel ratio becomes faster compared with the case shown by the broken line B.

Due to the above, after the end of fuel cut control, the target air-fuel ratio can be set to the stoichiometric air-fuel ratio so as to reduce the effect of the degree of deterioration of the upstream side exhaust purification catalyst 20 from the speed of change of the output air-fuel ratio of the downstream side air-fuel ratio sensor 41 in the judgment use air-fuel ratio region X. For this reason, according to the present embodiment, regardless of the degree of deterioration of the upstream side exhaust purification catalyst 20, it is possible to accurately diagnose the abnormality of deterioration of response the downstream side air-fuel ratio sensor 41 based on the output air-fuel ratio of the downstream side air-fuel ratio sensor 41 at the judgment use air-fuel ratio region X.

Note that, in the above embodiment, after the end of fuel cut control and before the start of post reset rich control, the target air-fuel ratio is made the stoichiometric air-fuel ratio. However, the target air-fuel ratio at this time does not necessarily have to be the stoichiometric air-fuel ratio and may also be an air-fuel ratio different from the stoichiometric air-fuel ratio. However, in this case, the target air-fuel ratio at this time has to be leaner than the air-fuel ratio (post reset rich air-fuel ratio) at the time of post reset rich control. Further, the target air-fuel ratio at this time is preferably the stoichiometric air-fuel ratio or more.

<Flow Chart>

Figure 13:
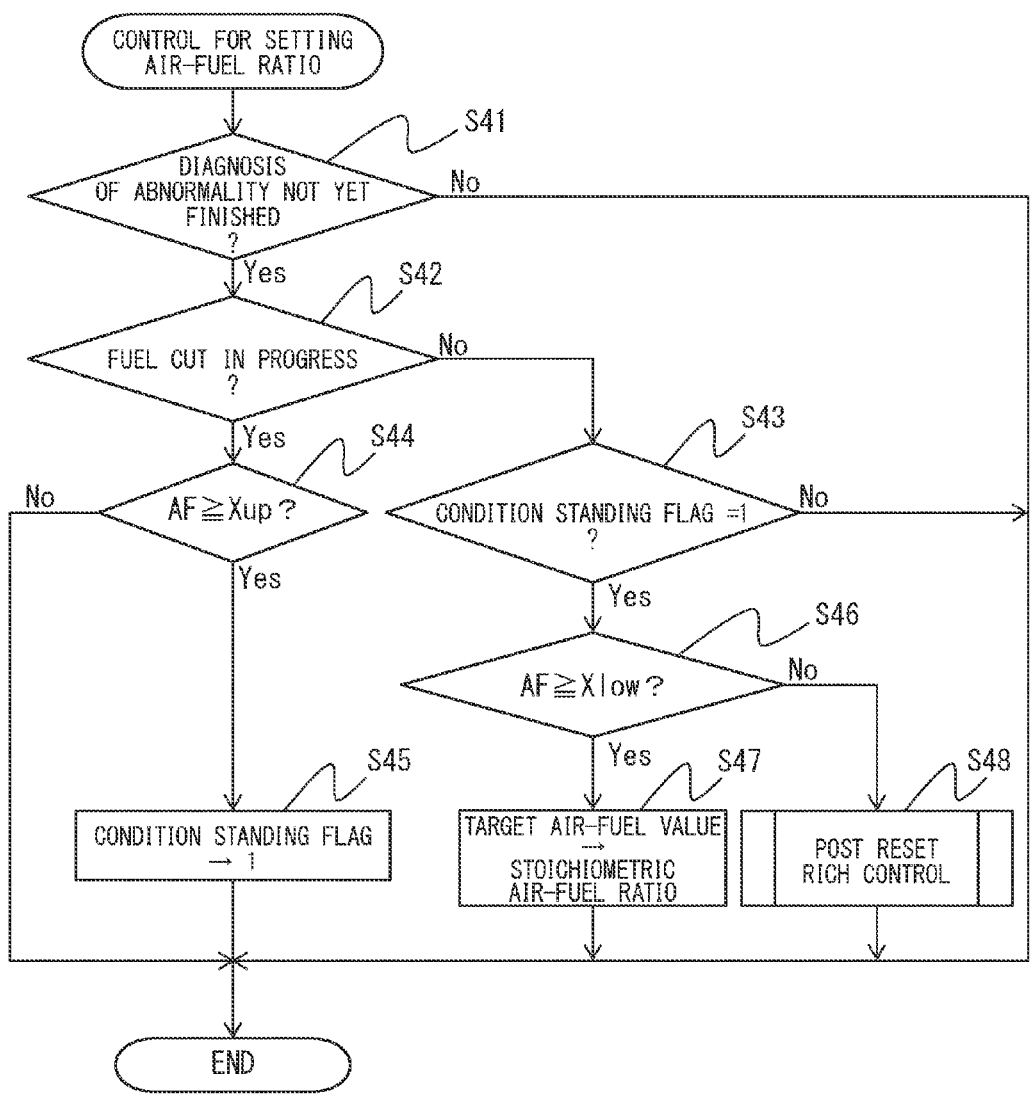
FIG. 13 is a flow chart showing a control routine for air-fuel ratio control which sets a target air-fuel ratio.

FIG. 13 is a flow chart showing the control routine of air-fuel ratio setting control setting the target air-fuel ratio of the exhaust gas flowing into the upstream side exhaust purification catalyst 20. The illustrated control routine is performed by interruption every certain time interval. Steps S41 to S45 are similar to steps S11 to S15 of FIG. 8, and therefore explanations will be omitted. However, as will be understood from steps S41 to S45, in the present embodiment, the downstream side air-fuel ratio sensor 41 still not being diagnosed for abnormality and the output air-fuel ratio of the downstream side air-fuel ratio sensor 41 becoming the upper limit air-fuel ratio Xup of the judgment use air-fuel ratio region X or more during fuel cut control are made conditions for execution of diagnosis of abnormality of the downstream side air-fuel ratio sensor 41. Note that, the conditions for execution of diagnosis of abnormality of the downstream side air-fuel ratio sensor 41 may include other conditions as well.

In the flow chart shown in FIG. 13, if fuel cut control is made to end, the routine proceeds from step S42 to step S43. Further, at step S43, if it is judged the condition standing flag is "1", the routine proceeds to step S46. At step S46, it is judged if the output air-fuel ratio AF of the downstream side air-fuel ratio sensor 41 is the lower limit air-fuel ratio Xlow of the judgment use air-fuel ratio region X or more. If, at step S46, it is judged that the output air-fuel ratio AF is the lower limit air-fuel ratio Xlow or more, that is, if it is judged that the output air-fuel ratio AF has not passed the judgment use air-fuel ratio region X after the end of fuel cut control, the routine proceeds to step S47. At step S47, the target air-fuel ratio is made the stoichiometric air-fuel ratio and the control routine is made to end. On the other hand, if, at step S46, it is judged that the output air-fuel ratio AF is lower than the lower limit air-fuel ratio Xlow, the routine proceeds to step S48. At step S48, the post reset rich control is performed, the target air-fuel ratio is made the post reset rich air-fuel ratio, and the control routine is made to end.

Note that, in the above embodiment, when the output air-fuel ratio of the downstream side air-fuel ratio sensor 41 reaches the lower limit air-fuel ratio Xlow of the judgment use air-fuel ratio region X (in the illustrated example, 17), the target air-fuel ratio is changed to the post reset rich air-fuel ratio so as to perform post reset rich control. However, the timing for changing the target air-fuel ratio from the stoichiometric air-fuel ratio to the post reset rich air-fuel ratio does not necessarily have to be when the output air-fuel ratio reaches the lower limit air-fuel ratio Xlow. For example, it may be when the elapsed time from when the fuel cut control ended is a predetermined elapsed time, when the output air-fuel ratio is an air-fuel ratio lower than the lower limit air-fuel ratio Xlow (for example, the stoichiometric air-fuel ratio), when the integrated value of the amount of intake air from when the fuel cut control ended (amount of air fed to a combustion chamber 5) reaches a predetermined amount of air, or other different timing. However, whatever the case, the timing for changing the target air-fuel ratio from the stoichiometric air-fuel ratio to the post reset rich air-fuel ratio has to be set so as to become a timing later than when the output air-fuel ratio reaches the lower limit air-fuel ratio Xlow after the end of fuel cut control.

Further, in the above embodiment, the target air-fuel ratio is set to the stoichiometric air-fuel ratio after the end of fuel cut control and before post reset rich control only when diagnosing abnormality of the downstream side air-fuel ratio sensor 41. Specifically, when the conditions for execution of diagnosis of abnormality of the downstream side air-fuel ratio sensor 41 stand (in the above-mentioned example, when the diagnosis of abnormality after startup of the internal combustion engine has not yet finished and the output air-fuel ratio becomes the upper limit air-fuel ratio Xup or more during fuel cut control), the target air-fuel ratio is set to the stoichiometric air-fuel ratio before the post reset rich control. However, regardless of whether diagnosing abnormality of the downstream side air-fuel ratio sensor 41, when performing fuel cut control, it is possible to always set the target air-fuel ratio temporarily at the stoichiometric air-fuel ratio before post reset rich control.

<Fourth Embodiment>

Next, referring to FIG. 14, a diagnosis system according to a fourth embodiment of the present invention will be explained. The diagnosis system according to the fourth embodiment basically is configured in the same way as the diagnosis system according to the third embodiment. In addition, in the fourth embodiment, a catalyst deterioration degree estimating means for estimating the degree of deterioration of the upstream side exhaust purification catalyst 20 is provided.

As will be understood from FIG. 11, the downstream side air-fuel ratio sensor 41 changes in trend in its output air-fuel ratio depending on whether there is an abnormality in the downstream side air-fuel ratio sensor 41 and also depending on the degree of deterioration of the upstream side exhaust purification catalyst 20. Conversely, when the degree of deterioration of the upstream side exhaust purification catalyst 20 is low, the output air-fuel ratio of the downstream side air-fuel ratio sensor 41 changes according to whether there is an abnormality in the downstream side air-fuel ratio sensor 41. Therefore, in this case, the target air-fuel ratio does not have to be temporarily set to the stoichiometric air-fuel ratio after the end of fuel cut control.

Therefore, in the present embodiment, a catalyst deterioration degree estimating means is provided for estimating the degree of deterioration of the upstream side exhaust purification catalyst 20. Further, when the degree of deterioration estimated by the catalyst deterioration degree estimating means is a predetermined reference degree of deterioration or less, even when diagnosing abnormality, post reset rich control is performed immediately after the end of fuel cut control and the target air-fuel ratio is made the post reset rich air-fuel ratio. On the other hand, if the degree of deterioration estimated by the catalyst deterioration degree estimating means is higher than a predetermined reference degree of deterioration, when diagnosing abnormality, in the same way as the third embodiment, after the end of fuel cut control, the target air-fuel ratio is made the stoichiometric air-fuel ratio.

Here, after the end of fuel cut control, since the oxygen storage amount of the upstream side exhaust purification catalyst 20 is large, if left in that state, the $NO_x$ in the exhaust gas will be difficult to remove and deterioration of the exhaust emission may be invited. In the present embodiment, when the degree of deterioration of the upstream side exhaust purification catalyst 20 is low, the target air-fuel ratio is set to the rich air-fuel ratio right after the end of fuel cut control, and therefore deterioration of the exhaust emission can be suppressed.

Note that, the catalyst deterioration degree estimating means estimates, for example, as the degree of deterioration of the upstream side exhaust purification catalyst 20, the amount of oxygen storable in the upstream side exhaust purification catalyst 20. As a specific method of estimation, first, the target air-fuel ratio is maintained at the rich air-fuel ratio until rich air-fuel ratio exhaust gas flows out from the upstream side exhaust purification catalyst 20. After that, if rich air-fuel ratio exhaust gas flows out from the upstream side exhaust purification catalyst 20, the target air-fuel ratio is maintained at the lean air-fuel ratio until lean air-fuel ratio exhaust gas flows out from the upstream side exhaust purification catalyst 20. Further, the amount of oxygen flowing into the upstream side exhaust purification catalyst 20 from when the rich air-fuel ratio exhaust gas flows out from the upstream side exhaust purification catalyst 20 to when the lean air-fuel ratio exhaust gas flows out is estimated based on the output of the air flowmeter 39, the output of the upstream side air-fuel ratio sensor 40, etc. The thus estimated amount of oxygen expresses the amount of oxygen storable in the upstream side exhaust purification catalyst 20.

Further, when the estimated value of the amount of oxygen which can be stored in the upstream side exhaust purification catalyst 20 is a predetermined threshold value or more, it is judged that the degree of deterioration of the upstream side exhaust purification catalyst 20 is a reference degree of deterioration or less. Even if diagnosing abnormality, the target air-fuel ratio is set to the rich air-fuel ratio immediately after the end of fuel cut control. On the other hand, when the estimated value of the amount of oxygen storable in the upstream side exhaust purification catalyst 20 is smaller than the predetermined threshold value, it is judged that the degree of deterioration of the upstream side exhaust purification catalyst 20 is higher than the reference degree of deterioration and, when diagnosing abnormality, the target air-fuel ratio is set to the stoichiometric air-fuel ratio after the end of fuel cut control.

<Flow Chart>

FIG. 14 is a flow chart showing a control routine for air-fuel ratio control which sets a target air-fuel ratio of the exhaust gas flowing into the upstream side exhaust purification catalyst 20. The illustrated control routine is performed by interruption every certain time interval. Steps S51 to S55 and S57 to S59 are respectively similar to steps S41 to S48 of FIG. 13, and therefore explanations will be omitted.

In the flow chart shown in FIG. 14, if fuel cut control is made to end, the routine proceeds from step S52 to step S53. Further, at step S53, if it is judged that the condition standing flag is "1", the routine proceeds to step S56. At step S56, it is judged if the estimated value C of the storable oxygen amount estimated by the catalyst deterioration degree estimating means is smaller than a predetermined threshold value Cref, that is, the degree of deterioration of the upstream side exhaust purification catalyst 20 is high. If, at step S56, it is judged that the estimated value C of the storable oxygen amount is the predetermined threshold value Cref or more, that is, if it is judged that the degree of deterioration of the upstream side exhaust purification catalyst 20 is low, the routine proceeds to step S59 where post reset rich control is performed. On the other hand, if, at step S56, it is judged that the estimated value C of the storable oxygen amount is smaller than the predetermined threshold value Cref, the routine proceeds to step S57. At step S57, in the same way as step S46 of FIG. 13, it is judged if the output air-fuel ratio AF of the downstream side air-fuel ratio sensor 41 is the lower limit air-fuel ratio Xlow of the judgment use air-fuel ratio region X or more.

<Fifth Embodiment>

Next, referring to FIG. 15, a diagnosis system according to a fifth embodiment of the present invention will be explained. The diagnosis system according to the fifth embodiment basically is configured in the same way as the diagnosis systems according to the third embodiment and the fourth embodiment. In addition, in the fifth embodiment, the target air-fuel ratio in the post reset rich control is changed in accordance with whether the target air-fuel ratio was temporarily set to the stoichiometric air-fuel ratio after the end of fuel cut control.

In the third embodiment and the fourth embodiment, when diagnosing abnormality of the downstream side air-fuel ratio sensor 41, sometimes the target air-fuel ratio is temporarily set to the stoichiometric air-fuel ratio after the end of fuel cut control. In this case, the start of post reset rich control is delayed and, at the time of fuel cut control, the release and reduction of the oxygen stored in the upstream side exhaust purification catalyst 20 are delayed by that extent.

Therefore, in the present embodiment, if the target air-fuel ratio is temporarily set to the stoichiometric air-fuel ratio after the end of fuel cut control, the target air-fuel ratio at the post reset rich control is set to an air-fuel ratio richer than the air-fuel ratio at normal times (the above-mentioned post reset rich air-fuel ratio). Due to this, even if setting the target air-fuel ratio temporarily to the stoichiometric air-fuel ratio after fuel cut control, the oxygen stored in the upstream side exhaust purification catalyst 20 during fuel cut control can be quickly released and reduced. Note that, the above-mentioned "an air-fuel ratio richer than the air-fuel ratio at normal times" may be a predetermined value or may be a value which changes in accordance with the degree of deterioration of the upstream side exhaust purification catalyst 20.

<Flow Chart>

FIG. 15 is a flow chart showing a control routine for air-fuel ratio control which sets a target air-fuel ratio of the exhaust gas flowing into the upstream side exhaust purification catalyst 20. The illustrated control routine is performed by interruption every certain time interval. Steps S61 to S68 are respectively similar to steps S51 to S58 of FIG. 14, and therefore explanations will be omitted.

In the flow chart shown in FIG. 15, if at step S67 it is judged that the output air-fuel ratio AF of the downstream side air-fuel ratio sensor 41 is the lower limit air-fuel ratio Xlow or more, that is, if after fuel cut control, it is judged that the output air-fuel ratio AF has not passed the judgment use air-fuel ratio region X, the routine proceeds to step S68 where the target air-fuel ratio is set to the stoichiometric air-fuel ratio. After that, at step S69, a stoichiometric air-fuel ratio switching flag is made "1" and the control routine is made to end. The stoichiometric air-fuel ratio switching flag is a flag which is made "1" when the target air-fuel ratio is sometimes temporarily made the stoichiometric air-fuel ratio after the end of the fuel cut control and before the start of the post reset rich control and which is made "0" otherwise.

On the other hand, if at step S66 it is judged that the estimated value C of the amount of storable oxygen estimated by the catalyst deterioration degree estimating means is the predetermined threshold value Cref or more or if at step S67 it is judged that the output air-fuel ratio AF of the downstream side air-fuel ratio sensor 41 is lower than the lower limit air-fuel ratio Xlow, the routine proceeds to step S70. At step S70, whether the stoichiometric air-fuel ratio switching flag is "1", that is, whether the target air-fuel ratio is temporarily made the stoichiometric air-fuel ratio after the end of fuel cut control and before the start of post reset rich control, is judged. If it is judged that the stoichiometric air-fuel ratio switching flag is "1", the routine proceeds to step S71. At step S71, the target air-fuel ratio at the time of post reset rich control is set to an air-fuel ratio (AFtrglow) richer than the post-reset rich air-fuel ratio (AFtrgnor) and the control routine is made to end. On the other hand, if at step S70 it is judged that the stoichiometric air-fuel ratio switching flag is not "1", the routine proceeds to step S72. At step S72, the target air-fuel ratio at the time of post reset rich control is set to the normal post-reset rich air-fuel ratio (AFtrgnor) and the control routine is made to end.

REFERENCE SIGNS LIST 1. engine body
5. combustion chamber
6. intake valve
8. exhaust valve
11. fuel injector
19. exhaust manifold
20. upstream side exhaust purification catalyst
21. upstream side casing
23. downstream side casing
24. downstream side exhaust purification catalyst
31. electronic control unit (ECU)
40. upstream side air-fuel ratio sensor
41. downstream side air-fuel ratio sensor

The invention claimed is:

1. A diagnosis system of an internal combustion engine comprising
    an exhaust purification catalyst arranged in an exhaust passage of the internal combustion engine and able to store oxygen in inflowing exhaust gas;
    an air-fuel ratio sensor arranged at a downstream side of the exhaust purification catalyst in a direction of exhaust flow and detecting an air-fuel ratio of exhaust gas flowing out from the exhaust purification catalyst; and
    an electronic control unit (ECU),
    wherein the ECU performs a fuel cut control in which a feed of fuel to a combustion chamber is stopped or decreased,
    wherein the ECU calculates a characteristic of change of an air-fuel ratio based on an output air-fuel ratio output from the air-fuel ratio sensor when the output air-fuel ratio first passes a part of an air-fuel ratio region of a stoichiometric air-fuel ratio or more after an end of the fuel cut control, and diagnoses abnormality of the air-fuel ratio sensor based on the characteristic of change of the air-fuel ratio, and
    wherein the ECU controls an air-fuel ratio of the exhaust gas flowing into the exhaust purification catalyst to a target air-fuel ratio,
    wherein the target air-fuel ratio is set to a first air-fuel ratio richer than the stoichiometric air-fuel ratio after the end of the fuel cut control, and,
    wherein when diagnosing abnormality of the air-fuel ratio sensor, the ECU sets the target air-fuel ratio to a second air-fuel ratio leaner than the first air-fuel ratio before setting to the first air-fuel ratio after the end of the fuel cut control.

2. The diagnosis system of an internal combustion engine according to claim 1, wherein when not diagnosing abnormality of the air-fuel ratio sensor, the ECU sets the target air-fuel ratio to the first air-fuel ratio immediately after the end of the fuel cut control.

3. The diagnosis system of an internal combustion engine according to claim 2, wherein when the air-fuel ratio sensor has already finished being diagnosed for abnormality after startup of the internal combustion engine, the ECU does not diagnose the air-fuel ratio sensor for abnormality.

4. The diagnosis system of an internal combustion engine according to claim 1, wherein the second air-fuel ratio is a stoichiometric air-fuel ratio.

5. The diagnosis system of an internal combustion engine according to claim 1, wherein when setting the target air-fuel ratio to the second air-fuel ratio after the end of the fuel cut control, the ECU changes the target air-fuel ratio from the second air-fuel ratio to the first air-fuel ratio after said air-fuel ratio sensor has finished being diagnosed for abnormality.

6. The diagnosis system of an internal combustion engine according to claim 1, wherein
    ECU estimates a degree of deterioration of the exhaust purification catalyst, and when the estimated degree of deterioration of the catalyst is a predetermined reference degree of deterioration or less, even when diagnosing the air-fuel ratio sensor for abnormality, the ECU immediately sets the target air-fuel ratio to the first air-fuel ratio after the end of the fuel cut control.

7. The diagnosis system of an internal combustion engine according to claim 1, wherein the ECU makes the first air-fuel ratio a richer air-fuel ratio when the target air-fuel ratio is set to the second air-fuel ratio before being set to the first air-fuel ratio compared with when the target air-fuel ratio is not set to a second air-fuel ratio before being set to the first air-fuel ratio.

8. The diagnosis system of an internal combustion engine according to claim 1, wherein
the air-fuel ratio sensor is a limit current type air-fuel ratio sensor outputting a limit current when an air-fuel ratio of exhaust gas passing through the air-fuel ratio sensor is within a predetermined air-fuel ratio region, and
the air-fuel ratio region is within the air-fuel ratio region in which the air-fuel ratio sensor generates the limit current.

9. The diagnosis system of an internal combustion engine according to claim 1, wherein the characteristic of change of the air-fuel ratio is a speed of change of the air-fuel ratio when the output air-fuel ratio of the air-fuel ratio sensor first passes the air-fuel ratio region, and,
in diagnosing abnormality of the air-fuel ratio sensor, when the speed of change of the air-fuel ratio is slower than a speed of change of the abnormality criteria, the ECU judges that the air-fuel ratio sensor is abnormal, while when the speed of change of the air-fuel ratio is faster than the speed of change of the abnormality criteria, the ECU judges that the air-fuel ratio sensor is normal.

10. The diagnosis system of an internal combustion engine according to claim 1, wherein the characteristic of change of the air-fuel ratio is an integrated value of air-fuel ratio obtained by integrating an output air-fuel ratio of the air-fuel ratio sensor at the time when the output air-fuel ratio is within the air-fuel ratio region,
in diagnosing abnormality of the air-fuel ratio sensor, when the integrated value of air-fuel ratio is an integrated value used as reference for abnormality or more, the ECU judges that the air-fuel ratio sensor is abnormal, while when the integrated value of air-fuel ratio is smaller than the integrated value used as reference for abnormality, the ECU judges that the air-fuel ratio sensor is normal.

11. The diagnosis system of an internal combustion engine according to claim 1, wherein in diagnosing abnormality of the air-fuel ratio sensor, when it is judged that the air-fuel ratio sensor is abnormal, the ECU lights a warning light.

* * * * *

UNITED STATES PATENT AND TRADEMARK OFFICE
CERTIFICATE OF CORRECTION

PATENT NO. : 9,719,449 B2
APPLICATION NO. : 14/900645
DATED : August 1, 2017
INVENTOR(S) : Hiroshi Miyamoto et al.

It is certified that error appears in the above-identified patent and that said Letters Patent is hereby corrected as shown below:

In the Claims

At Column 26, Line 66, change "ECU estimates" to "the ECU estimates"

Signed and Sealed this
Nineteenth Day of June, 2018

Andrei Iancu
*Director of the United States Patent and Trademark Office*